(12) United States Patent
Akasaka et al.

(10) Patent No.: US 11,867,656 B2
(45) Date of Patent: Jan. 9, 2024

(54) LIMITING-CURRENT TYPE GAS SENSOR

(71) Applicant: ROHM Co., LTD., Kyoto (JP)

(72) Inventors: Shunsuke Akasaka, Kyoto (JP); Yurina Amamoto, Kyoto (JP); Hiroyuki Yuji, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 110 days.

(21) Appl. No.: 17/166,101

(22) Filed: Feb. 3, 2021

(65) Prior Publication Data
US 2021/0247353 A1 Aug. 12, 2021

(30) Foreign Application Priority Data
Feb. 10, 2020 (JP) .................................. 2020-020268

(51) Int. Cl.
*G01N 27/407* (2006.01)
*G01N 27/409* (2006.01)

(52) U.S. Cl.
CPC ....... *G01N 27/4071* (2013.01); *G01N 27/409* (2013.01); *G01N 27/4075* (2013.01)

(58) Field of Classification Search
CPC ........... G01N 27/4071; G01N 27/4075; G01N 27/409
See application file for complete search history.

(56) References Cited

U.S. PATENT DOCUMENTS

| | | | | |
|---|---|---|---|---|
| 4,595,485 A | * | 6/1986 | Takahashi | G01N 27/4065 204/192.15 |
| 2015/0377823 A1 | * | 12/2015 | Akasaka | G01N 27/4166 156/60 |
| 2017/0122898 A1 | * | 5/2017 | Akasaka | G01N 27/304 |
| 2017/0241942 A1 | * | 8/2017 | Chung | G01N 27/4077 |
| 2017/0299543 A1 | * | 10/2017 | Akasaka | G01N 27/419 |
| 2018/0335400 A1 | * | 11/2018 | Mitsuno | G01N 27/4065 |
| 2019/0064105 A1 | * | 2/2019 | Nakatsukasa | G01N 27/4071 |

(Continued)

FOREIGN PATENT DOCUMENTS

| | | |
|---|---|---|
| JP | 59-166854 | 3/1986 |
| JP | 2015-212649 A | 11/2015 |
| JP | 2016099317 A * | 5/2016 |

(Continued)

OTHER PUBLICATIONS

Haruki et al., English translation of WO2019088026A1, 2019 (Year: 2019).*

(Continued)

*Primary Examiner* — Joshua L Allen
*Assistant Examiner* — Shizhi Qian
(74) *Attorney, Agent, or Firm* — CHIP LAW GROUP

(57) ABSTRACT

Disclosed herein is a limiting-current type gas sensor including a solid electrolyte, a first electrode disposed on the solid electrolyte, a second electrode disposed on the solid electrolyte, and a gas feed passage extending between a gas inlet and a first portion of the first electrode, the first portion facing the solid electrolyte. The first electrode is a first porous metal electrode. The gas feed passage is formed of a first porous transition metal oxide having a second melting point higher than a first melting point of the first electrode. The first porous transition metal oxide is $Ta_2O_5$, $TiO_2$, or $Cr_2O_3$.

10 Claims, 13 Drawing Sheets

(56) References Cited

U.S. PATENT DOCUMENTS

2020/0340940 A1* 10/2020 Furuta ................ G01N 27/4072

FOREIGN PATENT DOCUMENTS

| JP | 2018-132368 | 8/2018 | | |
|----|----|----|----|----|
| JP | 2019-082418 | 5/2019 | | |
| JP | 2019-086301 | 6/2019 | | |
| WO | WO-2017014033 A1 * | 1/2017 | ............. | G01N 27/41 |
| WO | WO-2019088026 A1 * | 5/2019 | ......... | F02D 41/1454 |

OTHER PUBLICATIONS

Notification of Reasons for Refusal cited in Japanese Application No. 2020020268, dated Oct. 17, 2023.

* cited by examiner

LIMITING-CURRENT TYPE GAS SENSOR

CROSS REFERENCE TO RELATED APPLICATIONS

This application claims priority benefit of Japanese Patent Application No. JP 2020-020268 filed in the Japan Patent Office on Feb. 3, 2021. Each of the above-referenced applications is hereby incorporated herein by reference in its entirety.

BACKGROUND

The present disclosure relates to a limiting-current type gas sensor.

Japanese Patent Laid-open No. Sho 59-166854 (hereinafter referred to as Patent Document 1) discloses a limiting electric current type oxygen sensor including an insulating substrate, a first electrode having gas permeability, a thin solid electrolyte film, and a second electrode having gas permeability, as illustrated in FIG. 6 of Patent Document 1. The first electrode, the thin solid electrolyte film, and the second electrode are sequentially formed on the insulating substrate. The first electrode and the second electrode are each formed of platinum or palladium. An oxygen gas passes through the first electrode, turning into oxygen ions. The oxygen ions are conducted through the thin solid electrolyte film and moved to the second electrode.

SUMMARY

Plural limiting electric current type oxygen sensors according to Patent Document 1 were manufactured, and the concentration of oxygen contained in a measurement target gas was measured using each of the plural limiting electric current type oxygen sensors. Consequently, a temperature coefficient of a limiting current value significantly varied among the plural limiting electric current type oxygen sensors. Therefore, it is difficult to accurately and stably obtain the concentration of oxygen contained in the measurement target gas using each of the limiting electric current type oxygen sensors according to Patent Document 1. In view of the issue described above, it is desirable to provide a limiting-current type gas sensor capable of reducing a variation in a temperature coefficient of a limiting current value.

A limiting-current type gas sensor according to an embodiment of the present disclosure includes a solid electrolyte, a first electrode, a second electrode, a gas feed passage. The first electrode is disposed on the solid electrolyte. The second electrode is disposed on the solid electrolyte. The gas feed passage extends between a gas inlet and a first portion of the first electrode. The first portion faces the solid electrolyte. The first electrode is a first porous metal electrode. The gas feed passage is formed of a first porous transition metal oxide having a second melting point higher than a first melting point of the first electrode. The first porous transition metal oxide is $Ta_2O_5$, $TiO_2$, or $Cr_2O_3$.

The limiting-current type gas sensor according to an embodiment of the present disclosure can reduce a variation in a temperature coefficient of a limiting current value.

DETAILED DESCRIPTION OF THE PREFERRED EMBODIMENTS

Embodiments will be described below. The same components will be denoted by the same reference signs and the description thereof will not be repeated.

First Embodiment

Figure 1:
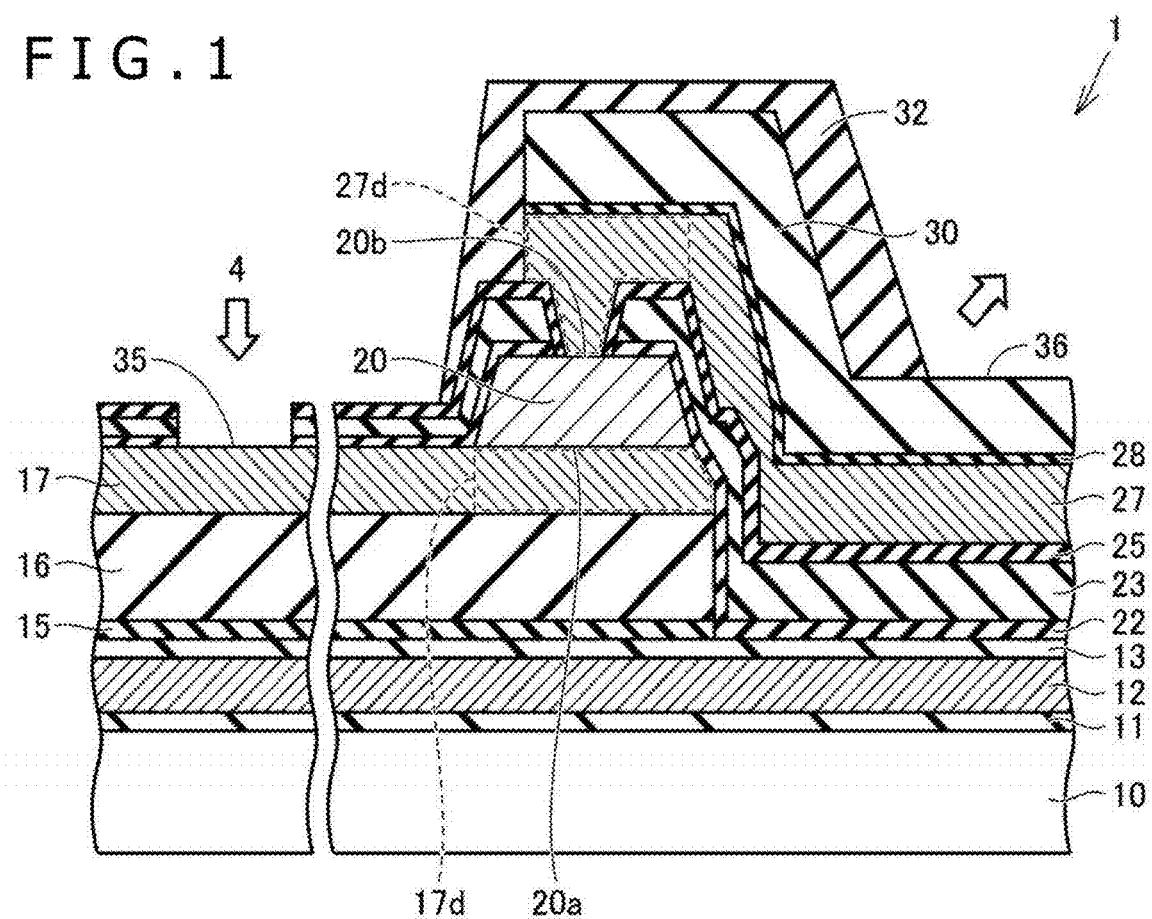
FIG. 1 is a schematic partial cross-sectional view of a limiting-current type gas sensor according to a first embodiment.

A limiting-current type gas sensor 1 according to a first embodiment will be described with reference to FIGS. 1 and 2. The limiting-current type gas sensor 1 can measure the concentration of nitrogen oxide ($NO_x$) contained in a measurement target gas 4 such as an exhaust gas from an automobile. The limiting-current type gas sensor 1 can measure, for example, the concentration of oxygen ($O_2$) contained in the measurement target gas 4 or the concentration of water vapor ($H_2O$) contained in the measurement target gas 4.

The limiting-current type gas sensor 1 mainly includes a gas feed passage 16, a first electrode 17, a solid electrolyte 20, and a second electrode 27. The limiting-current type gas sensor 1 may further include a substrate 10, a heater 12, a gas discharge passage 30, and an insulating film 32. The limiting-current type gas sensor 1 may further include insulating layers 11, 13, 15, 22, 23, 25, and 28.

The substrate 10 is, for example, a silicon (Si) substrate but is not limited thereto. For example, the substrate 10 has a thickness of 2 μm or less. This makes the heat capacity of the substrate 10 small, reducing the power consumption of the heater 12.

The heater 12 heats the solid electrolyte 20 to enable ion conduction in the solid electrolyte 20. The heater 12 is disposed on the substrate 10. Specifically, the heater 12 is formed on an upper surface of the substrate 10 with the insulating layer 11 interposed therebetween. The insulating layer 11 is, for example, formed of silicon dioxide ($SiO_2$) or aluminum oxide ($Al_2O_3$). The heater 12 is disposed on the insulating layer 11. The insulating layer 11 electrically insulates the heater 12 from the substrate 10. The heater 12 is, for example, a platinum (Pt) thin film heater or a polysilicon thin film heater. The insulating layer 13 is disposed on the heater 12. The heater 12 is sandwiched between the insulating layer 11 and the insulating layer 13. The insulating layer 13 is, for example, formed of silicon dioxide ($SiO_2$) or aluminum oxide ($Al_2O_3$).

The heater 12 may be formed on a lower surface of the substrate 10. For example, a laminate including the insulating layer 11, the heater 12, and the insulating layer 13 may be formed on the lower surface of the substrate 10. The heater 12 may be embedded in the substrate 10. For example, the laminate including the insulating layer 11, the heater 12, and the insulating layer 13 may be embedded in the substrate 10.

The insulating layer 15 is disposed on the insulating layer 13. The insulating layer 15 is, for example, a tantalum pentoxide ($Ta_2O_5$) layer.

The gas feed passage 16 is disposed on the insulating layer 13 with the insulating layer 15 interposed therebetween. The gas feed passage 16 extends between a gas inlet 35 and a first portion 17d of the first electrode 17. The first portion 17d faces the solid electrolyte 20. The length of the gas feed passage 16 in a direction along the upper surface of the substrate 10 (in a horizontal direction of FIG. 1) is, for example, 10 times or more than the thickness of the gas feed passage 16. The length of the gas feed passage 16 in the direction along the upper surface of the substrate 10 (in the horizontal direction of FIG. 1) is, for example, 10 times or more than the thickness of the first electrode 17.

The gas feed passage 16 is formed of a first porous transition metal oxide having a second melting point higher than a first melting point of the first electrode 17. The gas feed passage 16 is formed of the first porous transition metal oxide having the second melting point higher than a third melting point of the second electrode 27. In the present specification, a "transition metal" refers to any element in groups 3 to 11 on a long periodic table of elements according to the International Union of Pure and Applied Chemistry (IUPAC). The first porous transition metal oxide is tantalum pentoxide ($Ta_2O_5$), titanium dioxide ($TiO_2$), or chromium (III) oxide ($Cr_2O_3$). Table 1 depicts respective melting points of tantalum pentoxide ($Ta_2O_5$), titanium dioxide ($TiO_2$), and chromium(III) oxide ($Cr_2O_3$), and respective melting points of platinum (Pt) and palladium (Pd), which are examples of materials of the first electrode 17 and the second electrode 27.

[Table 1]

TABLE 1

| | Material | Melting Point (° C.) |
|---|---|---|
| Examples of Material of Gas Feed Passage 16 | $Ta_2O_5$ | 1880 |
| | $TiO_2$ | 1843 |

TABLE 1-continued

| | Material | Melting Point (° C.) |
|---|---|---|
| | $Cr_2O_3$ | 2435 |
| Examples of Material of First Electrode 17 and Second Electrode 27 | Pt | 1768 |
| | Pd | 1552 |

As described later, when the limiting-current type gas sensor 1 is operated at a high temperature to enable ion conduction in the solid electrolyte 20, vacancies in the first electrode 17 agglomerate, whereas vacancies in the gas feed passage 16 remain uniformly distributed. Therefore, the gas feed passage 16 can pass the measurement target gas 4 more easily than the first electrode 17.

A first packing factor of the gas feed passage 16 is, for example, 60% or less. The first packing factor of the gas feed passage 16 may be, for example, 45% or less. The gas feed passage 16 formed of the first porous transition metal oxide is obtained by obliquely vapor-depositing a transition metal oxide, for example. The gas feed passage 16 formed of the first porous transition metal oxide may be obtained by sintering powder of the transition metal oxide. The gas feed passage 16 may be a porous transition metal oxide sintered compact. The gas feed passage 16 limits the flow rate of the measurement target gas 4 flowing into the solid electrolyte 20 per unit time.

When the first packing factor of the gas feed passage 16 decreases and the porosity of the gas feed passage 16 increases, the measurement target gas 4 can pass through the gas feed passage 16 more easily, shortening a response time of the limiting-current type gas sensor 1. With the porosity of the gas feed passage 16 increased, thermal strain that occurs in the solid electrolyte 20 during operation of the limiting-current type gas sensor 1 can be alleviated in the gas feed passage 16. Thus, a variation in a temperature coefficient of a limiting current value of the limiting-current type gas sensor 1 can be reduced.

In the present specification, the packing factor of a layer is calculated as follows. First, a reflection spectrum of the layer is obtained. From this reflection spectrum, an optical thickness nd of the layer is calculated, where "n" represents a refractive index of the layer while "d" represents a physical thickness of the layer. After that, an SEM cross-sectional image of the layer is obtained. From the SEM cross-sectional image of the layer, the physical thickness d of the layer is obtained. From the optical thickness nd of the layer and the physical thickness d of the layer, the refractive index n of the layer is obtained. A refractive index $n_{100}$, which is a refractive index in a case where the packing factor of the layer is 100%, is obtained in advance. In general, it can be found from the Lorentz-Lorenz equation that the packing factor of the layer is proportional to $(n^2-1)/(n^2+2)$. Therefore, calculating a ratio of $(n^2-1)/(n^2+2)$ to $(n_{100}^2-1)/(n_{100}^2+2)$ obtains the packing factor of the layer.

The first electrode 17 is disposed on the gas feed passage 16. The first electrode 17 is disposed on the solid electrolyte 20. Specifically, the first electrode 17 is disposed on a first surface 20a of the solid electrolyte 20 (a lower surface of the solid electrolyte 20). The first surface 20a faces the substrate 10. The first portion 17d of the first electrode 17 faces the first surface 20a of the solid electrolyte 20. The first electrode 17 is disposed between the solid electrolyte 20 and the gas feed passage 16. The first portion 17d of the first electrode 17 refers to a portion of the first electrode 17. This portion is sandwiched between the solid electrolyte 20 and the gas feed passage 16 in a direction normal to the upper surface of the substrate 10. The first portion 17d of the first electrode 17 may be in contact with the first surface 20a of the solid electrolyte 20.

The first electrode 17 is a first porous metal electrode. Therefore, the first electrode 17 can easily pass the measurement target gas 4 toward the solid electrolyte 20. The first melting point of the first electrode 17 is lower than the second melting point of the first porous transition metal oxide forming the gas feed passage 16. The first melting point of the first electrode 17 is lower than a fourth melting point of a second porous transition metal oxide forming the gas discharge passage 30. The first electrode 17 is, for example, formed of platinum (Pt) or palladium (Pd).

For example, the first electrode 17 has a thickness of 0.1 μm or more and 10 μm or less. The first electrode 17 may extend to the gas inlet 35. The length of the first electrode 17 in the direction along the upper surface of the substrate 10 (in the horizontal direction of FIG. 1) is, for example, 10 times or more than the thickness of the first electrode 17. Therefore, when the limiting-current type gas sensor 1 is operated at a high temperature and the vacancies in the first electrode 17 agglomerate, the permeability of the measurement target gas 4 in the first electrode 17 in the direction along the upper surface of the substrate 10 (in the horizontal direction of FIG. 1) significantly decreases, while the permeability of the measurement target gas 4 in the first electrode 17 in the thickness direction of the first electrode 17 (in a vertical direction of FIG. 1) is relatively high. When the limiting-current type gas sensor 1 is operated at a high temperature, the gas feed passage 16 can pass the measurement target gas 4 more easily than the first electrode 17. Even if the first electrode 17 extends to the gas inlet 35, the measurement target gas 4 mainly flows through the gas feed passage 16.

The solid electrolyte 20 is disposed on the first electrode 17. The solid electrolyte 20 includes the first surface 20a (lower surface), which faces the substrate 10, and a second surface 20b (upper surface), which is on the opposite side of the first surface 20a. The solid electrolyte 20 is an ion conductor such as an oxygen ion conductor. For example, the solid electrolyte 20 is an oxygen ion conductor in which CaO, MgO, $Y_2O_3$, $Yb_2O_3$, or other substances is added as a stabilizer to a matrix such as $ZrO_2$, $HfO_2$, $ThO_2$, or $Bi_2O_3$. Specifically, the solid electrolyte 20 is formed of yttria-stabilized zirconia (YSZ). The solid electrolyte 20 may be, for example, an oxygen ion conductor formed of (La, Sr, Ga, Mg, Co)$O_3$. Heating the solid electrolyte 20 by the heater 12 makes the solid electrolyte 20 have ionic conductivity. During operation of the limiting-current type gas sensor 1, the solid electrolyte 20 is heated by the heater 12 at a temperature of 400° C. or higher and 750° C. or lower, for example.

The solid electrolyte 20 is a thin film having a thickness of, for example, 1 μm or more and 10 μm or less, and the limiting-current type gas sensor 1 is a limiting-current type gas sensor of a thin film type. The solid electrolyte 20 may be, for example, a bulk having a thickness of 100 μm or more, and the limiting-current type gas sensor 1 may be a limiting-current type gas sensor of a bulk type.

The insulating layer 22 is disposed on the insulating layer 13, a side surface of the gas feed passage 16, an upper surface and a side surface of the first electrode 17, side surfaces of the solid electrolyte 20, and part of the second surface 20b of the solid electrolyte 20. The insulating layer 22 is, for example, a tantalum pentoxide ($Ta_2O_5$) layer. The insulating layer 23 is disposed on the insulating layer 22.

The insulating layer 23 is, for example, a silicon dioxide (SiO$_2$) layer. The insulating layer 25 is disposed on the insulating layer 23 and side surfaces of the insulating layer 22. The insulating layer 25 is, for example, a titanium dioxide (TiO$_2$) layer. The insulating layer 22, the insulating layer 23, and the insulating layer 25 include a first opening and a second opening. Part of the second surface 20b of the solid electrolyte 20 is exposed through the first opening. The first electrode 17 is exposed through the second opening. The second opening functions as the gas inlet 35. If the first electrode 17 does not extend to the gas inlet 35, the gas feed passage 16 is exposed through the second opening.

The second electrode 27 is disposed on the solid electrolyte 20. Specifically, the second electrode 27 is disposed on the second surface 20b of the solid electrolyte 20 (on the upper surface of the solid electrolyte 20). A second portion 27d of the second electrode 27 faces the second surface 20b of the solid electrolyte 20. The second portion 27d of the second electrode 27 refers to a portion of the second electrode 27. This portion faces the second surface 20b of the solid electrolyte 20 in the direction normal to the upper surface of the substrate 10. The second portion 27d of the second electrode 27 may be in contact with the second surface 20b of the solid electrolyte 20. The second electrode 27 is disposed between the solid electrolyte 20 and the gas discharge passage 30.

The second electrode 27 is a second porous metal electrode. Therefore, the second electrode 27 can easily pass the gas toward the gas discharge passage 30. The third melting point of the second electrode 27 is lower than the second melting point of the first porous transition metal oxide forming the gas feed passage 16. The third melting point of the second electrode 27 is lower than the fourth melting point of the second porous transition metal oxide forming the gas discharge passage 30. The second electrode 27 is, for example, formed of platinum (Pt) or palladium (Pd).

The second electrode 27 is disposed on the insulating layer 25. The second electrode 27 is disposed in the first opening included in the insulating layer 22, the insulating layer 23, and the insulating layer 25. For example, the second electrode 27 has a thickness of 0.1 µm or more and 10 µm or less. The second electrode 27 may extend to a gas outlet 36. The length of the second electrode 27 in the direction along the upper surface of the substrate 10 (in the horizontal direction of FIG. 1) is, for example, 10 times or more than the thickness of the second electrode 27. Therefore, when the limiting-current type gas sensor 1 is operated at a high temperature and vacancies in the second electrode 27 agglomerate, the gas permeability of the second electrode 27 in the direction along the upper surface of the substrate 10 (in the horizontal direction of FIG. 1) significantly decreases, while the gas permeability of the second electrode 27 in the thickness direction of the second electrode 27 (in the vertical direction of FIG. 1) is relatively high.

The insulating layer 28 is disposed on the second electrode 27. The insulating layer 28 is, for example, a titanium dioxide (TiO$_2$) layer.

The gas discharge passage 30 is disposed on the insulating layer 28. The gas discharge passage 30 extends between the gas outlet 36 and the second portion 27d of the second electrode 27. The second portion 27d faces the solid electrolyte 20. The length of the gas discharge passage 30 in the direction along the upper surface of the substrate 10 (in the horizontal direction of FIG. 1) is, for example, 10 times or more than the thickness of the gas discharge passage 30. The length of the gas discharge passage 30 in the direction along the upper surface of the substrate 10 (in the horizontal direction of FIG. 1) is, for example, 10 times or more than the thickness of the second electrode 27.

The gas discharge passage 30 is formed of the second porous transition metal oxide having the fourth melting point higher than the first melting point of the first electrode 17. The gas discharge passage 30 is formed of the second porous transition metal oxide having the fourth melting point higher than the third melting point of the second electrode 27. The second porous transition metal oxide is tantalum pentoxide (Ta$_2$O$_5$), titanium dioxide (TiO$_2$) or chromium(III) oxide (Cr$_2$O$_3$).

When the limiting-current type gas sensor 1 is operated at a high temperature to enable ion conduction in the solid electrolyte 20, the vacancies in the second electrode 27 agglomerate, whereas vacancies in the gas discharge passage 30 remain uniformly distributed. Therefore, the gas discharge passage 30 can pass the gas more easily than the second electrode 27. Even if the second electrode 27 extends to the gas outlet 36, the gas mainly flows through the gas discharge passage 30.

A second packing factor of the gas discharge passage 30 is, for example, 60% or less. The second packing factor of the gas discharge passage 30 may be, for example, 45% or less. The gas discharge passage 30 formed of the second porous transition metal oxide is obtained by obliquely vapor-depositing a transition metal oxide, for example. The gas discharge passage 30 formed of the second porous transition metal oxide may be obtained by sintering powder of the transition metal oxide. The gas discharge passage 30 may be a porous transition metal oxide sintered compact.

When the second packing factor of the gas discharge passage 30 decreases and the porosity of the gas discharge passage 30 increases, the gas can pass through the gas discharge passage 30 more easily, shortening the response time of the limiting-current type gas sensor 1. With the porosity of the gas discharge passage 30 increased, thermal strain that occurs in the solid electrolyte 20 during operation of the limiting-current type gas sensor 1 can be alleviated in the gas discharge passage 30. Thus, the variation in the temperature coefficient of the limiting current value of the limiting-current type gas sensor 1 can be reduced.

The insulating film 32 covers the laminate including the first portion 17d of the first electrode 17, the solid electrolyte 20, and the second portion 27d of the second electrode 27. The insulating film 32 further covers a portion of the gas discharge passage 30. This portion faces the second portion 27d of the second electrode 27. The insulating film 32 is more distant from the substrate 10 than the second electrode 27 is. The insulating film 32 is further disposed on the insulating layer 25, a side surface of the second electrode 27, and a side surface of the insulating layer 28. The insulating film 32 is, for example, a silicon dioxide (SiO$_2$) layer.

Figure 2:
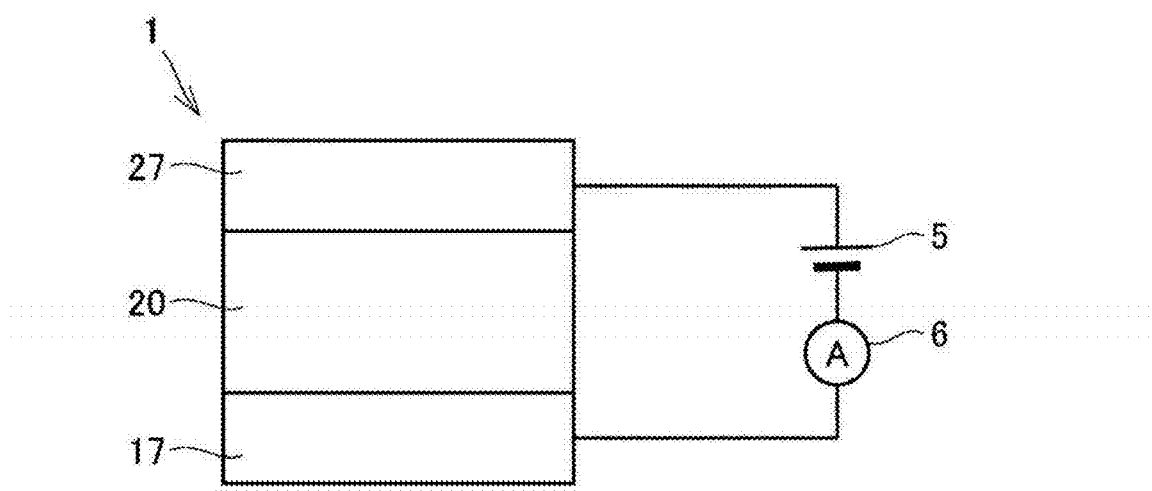
FIG. 2 is a circuit diagram of the limiting-current type gas sensor according to the first embodiment.

As illustrated in FIG. 2, the limiting-current type gas sensor 1 is connected to a voltage source 5 and a current detector 6. Specifically, a negative electrode of the voltage source 5 is connected to the first electrode 17, while a positive electrode of the voltage source 5 is connected to the second electrode 27. The current detector 6 detects the limiting current flowing between the first electrode 17 and the second electrode 27 of the limiting-current type gas sensor 1.

With reference to FIG. 1 and FIGS. 3 to 10, an example of a method of manufacturing the limiting-current type gas sensor 1 according to the present embodiment will be described.

Figure 3:
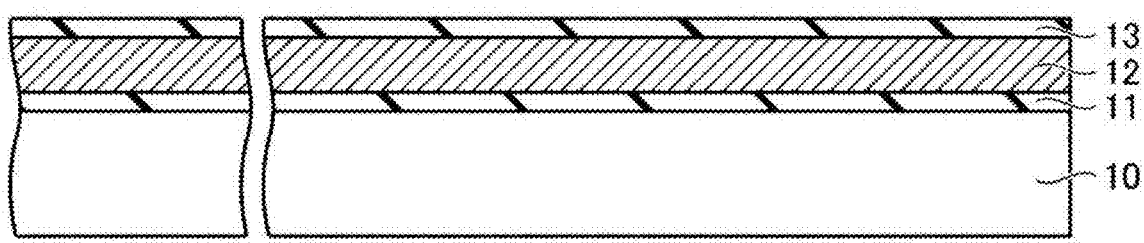
FIG. 3 is a schematic plan view illustrating one process of a method of manufacturing the limiting-current type gas sensor according to the first embodiment.

With reference to FIG. 3, the insulating layer 11 is formed on the substrate 10. For example, the insulating layer 11 may be formed by vapor-depositing a silicon dioxide on the substrate 10 or by oxidizing the upper surface of the substrate 10.

With reference to FIG. 3, the heater 12 is formed on the insulating layer 11. The heater 12 is, for example, the platinum (Pt) thin film heater or the polysilicon thin film heater. The platinum (Pt) thin film heater is, for example, formed by applying a platinum paste on the insulating layer 11. The polysilicon thin film heater is, for example, formed by disposing a polysilicon layer on the insulating layer 11 and then adding boron (B) to the polysilicon layer. With reference to FIG. 3, the insulating layer 13 is formed on the heater 12. The insulating layer 13 is, for example, formed by vapor-depositing a silicon dioxide on the heater 12.

Figure 4:
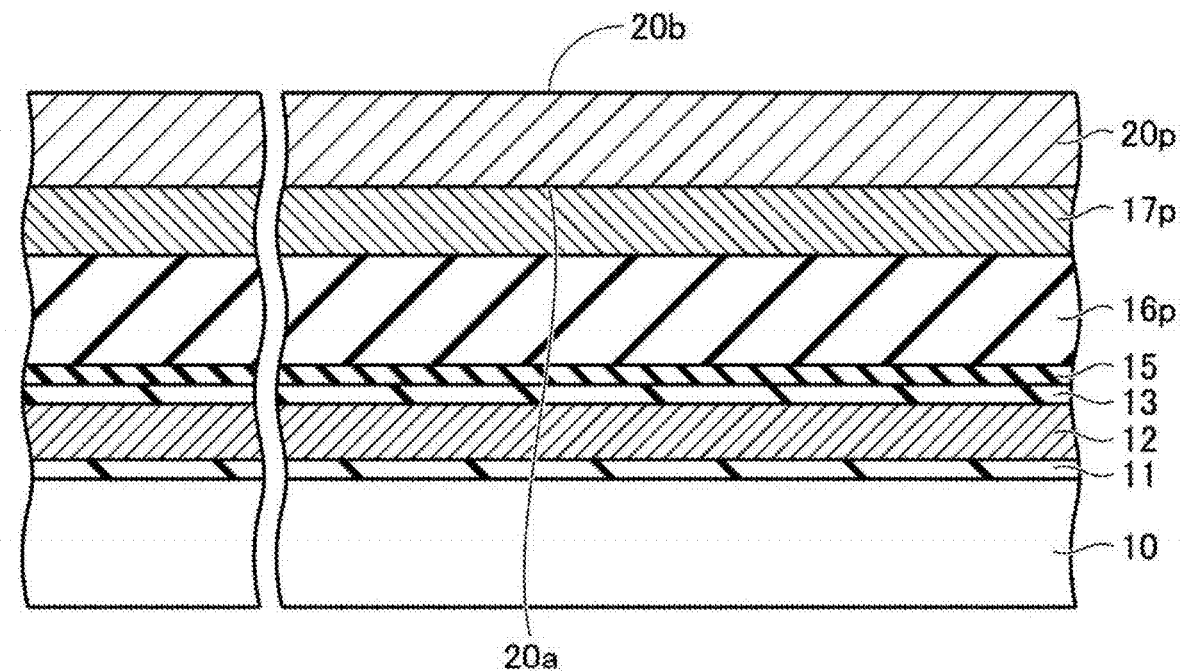
FIG. 4 is a schematic plan view illustrating a process following the process illustrated in FIG. 3 in the method of manufacturing the limiting-current type gas sensor according to the first embodiment.

With reference to FIG. 4, the insulating layer 15 is formed on the insulating layer 13. The insulating layer 15 is, for example, the tantalum pentoxide ($Ta_2O_5$) layer. The insulating layer 15 is, for example, formed by a sputtering method.

With reference to FIG. 4, a gas feed passage material layer 16p is formed on the insulating layer 15. The gas feed passage material layer 16p is, for example, formed by a first method or a second method described below.

In the first method, the gas feed passage material layer 16p is formed by obliquely vapor-depositing a transition metal oxide. Obliquely vapor-depositing the transition metal oxide forms the gas feed passage material layer 16p into a porous layer. The gas feed passage material layer 16p is formed of the first porous transition metal oxide. The first porous transition metal oxide is tantalum pentoxide ($Ta_2O_5$), titanium dioxide ($TiO_2$) or chromium(III) oxide ($Cr_2O_3$).

A vapor-deposition angle at which the transition metal oxide is obliquely vapor-deposited is 70° or higher. By setting the vapor-deposition angle to 70° or higher, the gas feed passage material layer 16p is formed into the porous layer. The vapor-deposition angle may be 80° or higher or 84° or higher. By setting the vapor-deposition angle to 80° or higher, the first packing factor of the gas feed passage material layer 16p can be set to 60% or less. By setting the vapor-deposition angle to 84° or higher, the first packing factor of the gas feed passage material layer 16p can be set to 45% or less. The vapor-deposition angle is less than 90°. This makes it possible to deposit the gas feed passage material layer 16p on the insulating layer 15. In the present specification, the vapor-deposition angle is defined as an angle between the direction normal to the upper surface of the substrate 10 and a direction in which a material is vapor-deposited.

As the vapor-deposition angle increases, the first packing factor of the gas feed passage material layer 16p decreases and the porosity of the gas feed passage material layer 16p increases. For example, obliquely vapor-depositing a tantalum pentoxide ($Ta_2O_5$) at a vapor-deposition angle of 80° forms a porous layer with the first packing factor of 52%.

In the second method, the gas feed passage material layer 16p may be formed by sintering powder of the transition metal oxide.

With reference to FIG. 4, a first electrode material layer 17p is formed on the gas feed passage material layer 16p. The first electrode material layer 17p is a porous metal layer. The first electrode material layer 17p is, for example, formed of platinum (Pt) or palladium (Pd). The first electrode material layer 17p is, for example, formed by the sputtering method.

With reference to FIG. 4, a solid electrolyte material layer 20p is formed on the first electrode material layer 17p. The solid electrolyte material layer 20p includes the first surface 20a, which faces the substrate 10, and the second surface 20b, which is on the opposite side of the first surface 20a. The solid electrolyte material layer 20p is, for example, a layer in which CaO, MgO, $Y_2O_3$, $Yb_2O_3$, or other substances is added as a stabilizer to the matrix such as $ZrO_2$, $HfO_2$, $ThO_2$, or $Bi_2O_3$. Specifically, the solid electrolyte material layer 20p is formed of yttria-stabilized zirconia (YSZ). The solid electrolyte material layer 20p is, for example, formed by the sputtering method.

Figure 5:
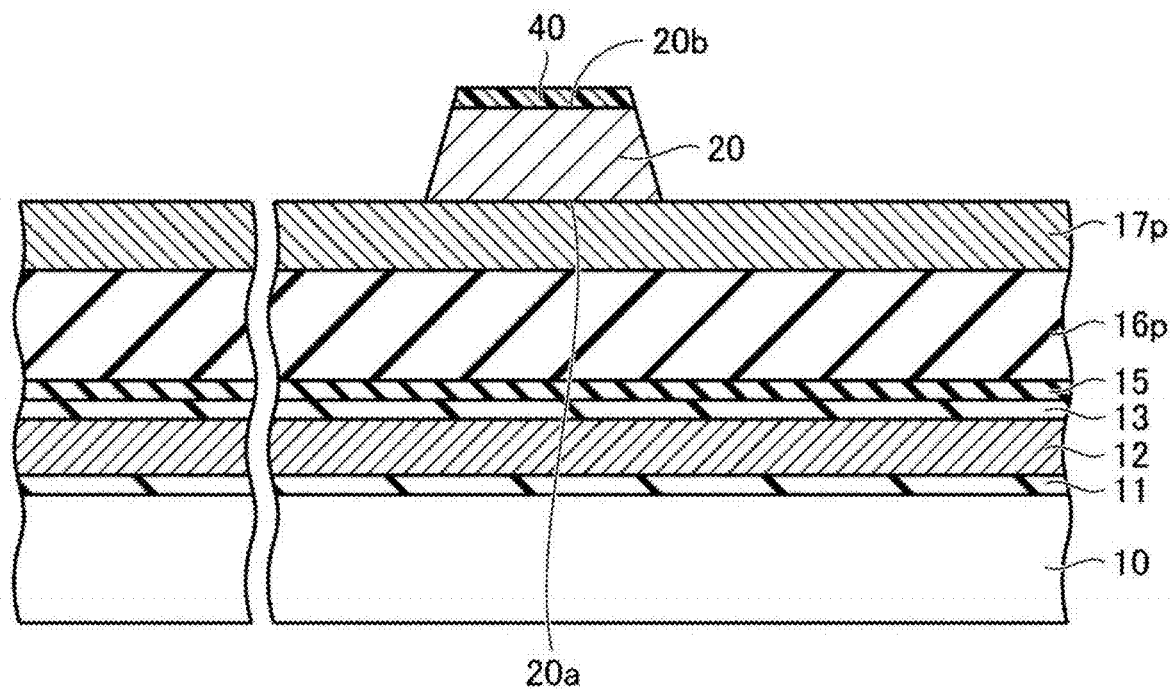
FIG. 5 is a schematic plan view illustrating a process following the process illustrated in FIG. 4 in the method of manufacturing the limiting-current type gas sensor according to the first embodiment.

With reference to FIG. 5, a mask 40 is formed on the solid electrolyte material layer 20p. Etching part of the solid electrolyte material layer 20p using the mask 40 forms the solid electrolyte 20 on the first electrode material layer 17p. The material of the mask 40 is, for example, a photoresist. The part of the solid electrolyte material layer 20p is removed by plasma etching using a boron trichloride ($BCl_3$) gas, for example. The mask 40 is removed by asking.

Figure 6:
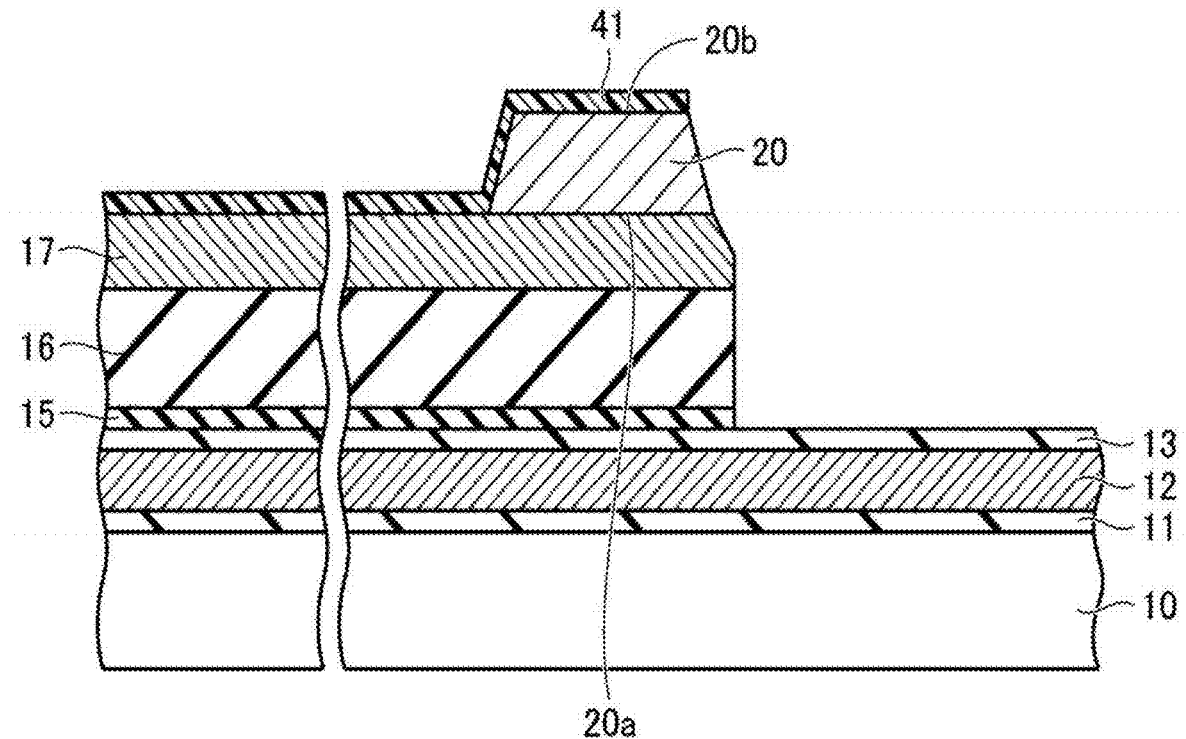
FIG. 6 is a schematic plan view illustrating a process following the process illustrated in FIG. 5 in the method of manufacturing the limiting-current type gas sensor according to the first embodiment.

With reference to FIG. 6, a mask 41 is formed on the first electrode material layer 17p and the solid electrolyte material layer 20p. Etching part of the first electrode material layer 17p and part of the gas feed passage material layer 16p using the mask 41 forms the first electrode 17 and the gas feed passage 16. The material of the mask 41 is, for example, a photoresist. The part of the first electrode material layer 17p is, for example, removed by plasma etching using a mixed gas of argon and oxygen. The part of the gas feed passage material layer 16p is, for example, removed by plasma etching using a chlorine gas. The mask 41 is removed by asking.

Figure 7:
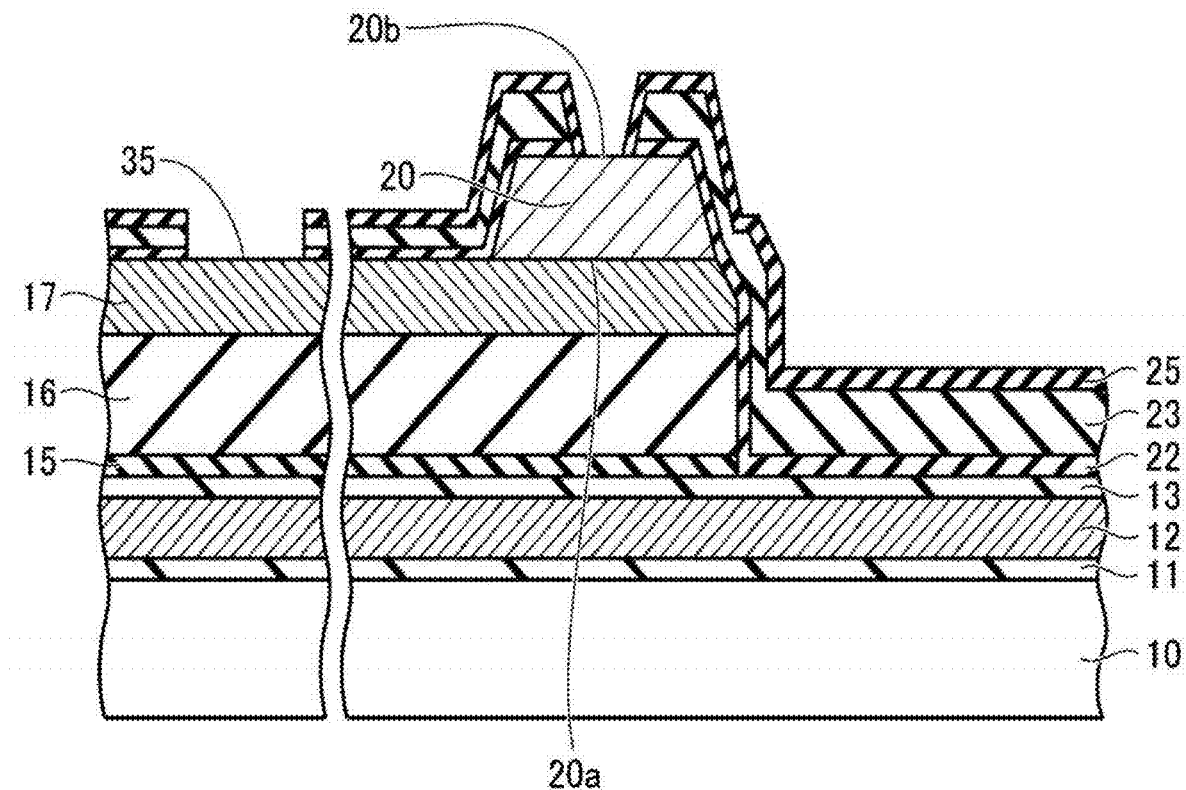
FIG. 7 is a schematic plan view illustrating a process following the process illustrated in FIG. 6 in the method of manufacturing the limiting-current type gas sensor according to the first embodiment.

With reference to FIG. 7, the insulating layer 22 is formed on the insulating layer 13, the side surface of the gas feed passage 16, the first electrode 17, and the solid electrolyte 20. The insulating layer 22 is, for example, formed by the sputtering method. The insulating layer 22 is, for example, the tantalum pentoxide ($Ta_2O_5$) layer. The insulating layer 23 is formed on the insulating layer 22. The insulating layer 23 is, for example, the silicon dioxide ($SiO_2$) layer. Etching part of the insulating layer 22 and part of the insulating layer 23 forms the first opening in the insulating layer 22 and the insulating layer 23. Part of the second surface 20b of the solid electrolyte 20 is exposed through the first opening.

With reference to FIG. 7, the insulating layer 25 is formed on the insulating layer 23 and the side surface of the insulating layer 22 by the sputtering method. The insulating layer 25 is, for example, the titanium dioxide ($TiO_2$) layer. Etching the insulating layer 22, the insulating layer 23, and the insulating layer 25 forms the second opening in the insulating layer 22, the insulating layer 23, and the insulating layer 25. The second opening functions as the gas inlet 35. The first electrode 17 is exposed through the second opening. If the first electrode 17 does not extend to the gas inlet 35, the gas feed passage 16 is exposed through the second opening.

Figure 8:
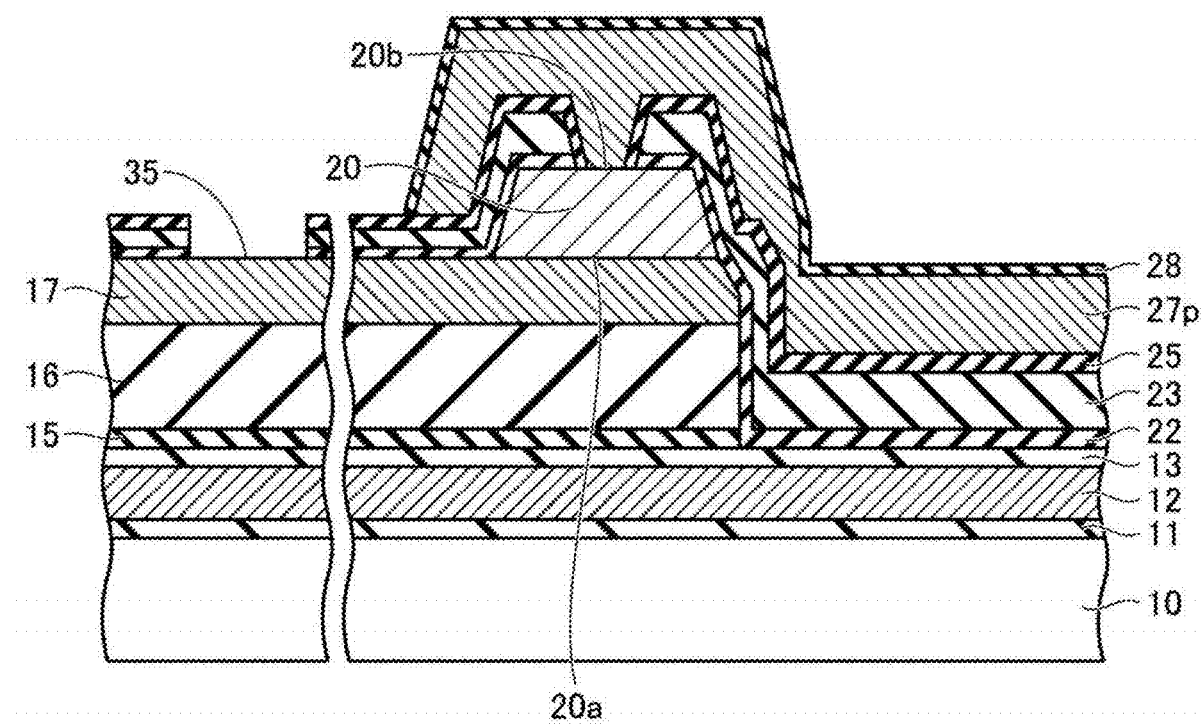
FIG. 8 is a schematic plan view illustrating a process following the process illustrated in FIG. 7 in the method of manufacturing the limiting-current type gas sensor according to the first embodiment.

With reference to FIG. 8, a second electrode material layer 27p is formed on the insulating layer 25 and the second surface 20b, which is exposed through the first opening, of the solid electrolyte 20. The second electrode material layer 27p is a porous metal layer. The second electrode material layer 27p is, for example, formed of platinum (Pt) or palladium (Pd). The second electrode material layer 27p is, for example, formed by the sputtering method.

With reference to FIG. 8, the insulating layer 28 is formed on the second electrode material layer 27p. The insulating layer 28 is, for example, formed by the sputtering method. The insulating layer 28 is, for example, the titanium dioxide ($TiO_2$) layer.

Figure 9:
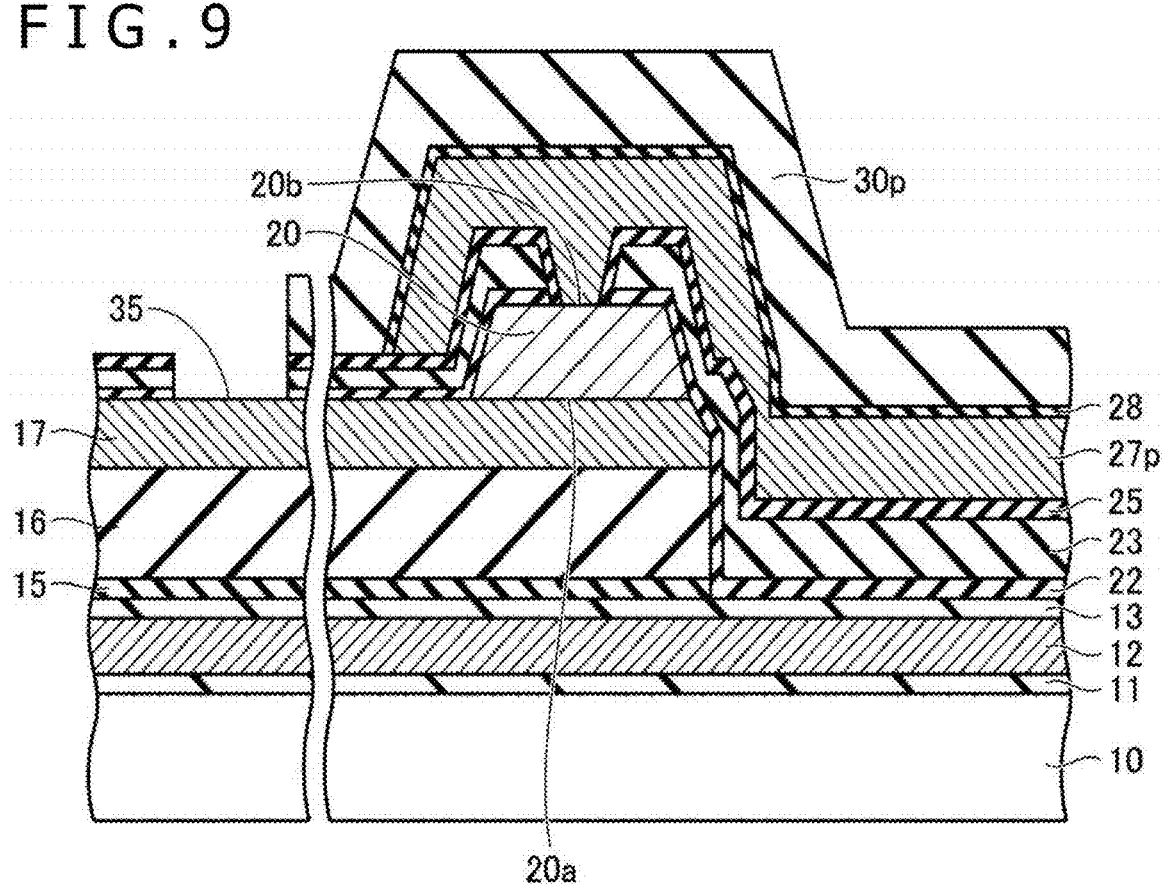
FIG. 9 is a schematic plan view illustrating a process following the process illustrated in FIG. 8 in the method of manufacturing the limiting-current type gas sensor according to the first embodiment.

With reference to FIG. 9, a gas discharge passage material layer 30p is formed on the insulating layer 25 and the insulating layer 28. The gas discharge passage material layer 30p is, for example, formed by the first method or the second method described below.

In the first method, the gas discharge passage material layer 30p is formed by obliquely vapor-depositing a transition metal oxide. Obliquely vapor-depositing the transition metal oxide forms the gas discharge passage material layer 30p into a porous layer. The gas discharge passage material layer 30p is formed of the second porous transition metal oxide. The second porous transition metal oxide is tantalum pentoxide ($Ta_2O_5$), titanium dioxide ($TiO_2$), or chromium (III) oxide ($Cr_2O_3$).

The vapor-deposition angle at which the transition metal oxide is obliquely vapor-deposited is 70° or higher. By setting the vapor-deposition angle to 70° or higher, the gas discharge passage material layer 30p is formed into the porous layer. The vapor-deposition angle may be 80° or higher or 84° or higher. By setting the vapor-deposition angle to 80° or higher, the second packing factor of the gas discharge passage material layer 30p can be set to 60% or less. By setting the vapor-deposition angle to 84° or higher, the second packing factor of the gas discharge passage material layer 30p can be set to 45% or less. The vapor-deposition angle is less than 90°. This makes it possible to deposit the gas discharge passage material layer 30p on the insulating layer 28.

As the vapor-deposition angle increases, the second packing factor of the gas discharge passage material layer 30p decreases and the porosity of the gas discharge passage material layer 30p increases. For example, obliquely vapor-depositing a tantalum pentoxide ($Ta_2O_5$) at a vapor-deposition angle of 80° forms a porous layer with the second packing factor of 52%.

In the second method, the gas discharge passage material layer 30p may be formed by sintering powder of the transition metal oxide.

Figure 10:
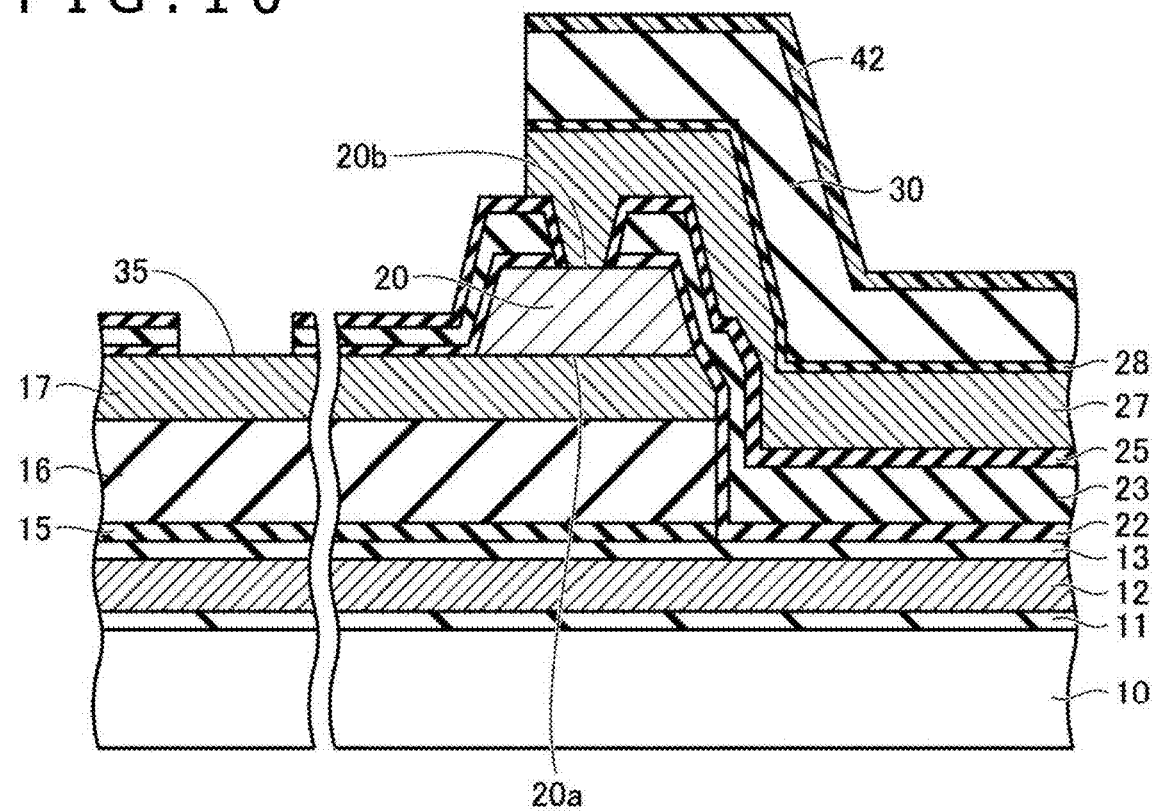
FIG. 10 is a schematic plan view illustrating a process following the process illustrated in FIG. 9 in the method of manufacturing the limiting-current type gas sensor according to the first embodiment.

With reference to FIG. 10, a mask 42 is formed above the insulating layer 25 and the insulating layer 28. Etching part of the second electrode material layer 27p, part of the gas discharge passage material layer 30p, part of the insulating layer 28 using the mask 42 forms the second electrode 27 and the gas discharge passage 30. The material of the mask 42 is, for example, a photoresist. The part of the gas discharge passage material layer 30p is, for example, removed by plasma etching using a carbon tetrafluoride ($CF_4$) gas. The part of the insulating layer 28 is removed by plasma etching using the carbon tetrafluoride ($CF_4$) gas. The part of the second electrode material layer 27p is, for example, removed by plasma etching using a mixed gas of argon and oxygen.

After that, the mask 42 is removed by asking. The insulating film 32 is formed on the gas discharge passage 30, the insulating layer 25, the side surface of the second electrode 27, and the side surface of the insulating layer 28. The insulating film 32 covers the laminate including the first portion 17d of the first electrode 17, the solid electrolyte 20, and the second portion 27d of the second electrode 27. The insulating film 32 is, for example, the silicon dioxide ($SiO_2$) layer. In this manner, the limiting-current type gas sensor 1 illustrated in FIG. 1 is obtained.

The operation of the limiting-current type gas sensor 1 will be described below, taking as an example a case where the measurement target gas 4 is an exhaust gas from an automobile and a component gas contained in the measurement target gas 4 is nitrogen oxide ($NO_x$).

The measurement target gas 4 flows into the limiting-current type gas sensor 1 from the gas inlet 35. The gas feed passage 16 can pass the measurement target gas 4 more easily than the first electrode 17. The measurement target gas 4 flows mainly through the gas feed passage 16 from the gas inlet 35 to the first electrode 17. The gas feed passage 16 limits the flow rate of the measurement target gas 4 flowing into the solid electrolyte 20 per unit time. The first electrode 17 decomposes nitric oxide NO, which makes up a large portion of the nitrogen oxide ($NO_x$) contained in the measurement target gas 4, into nitrogen ($N_2$) and oxygen ($O_2$).

As illustrated in FIG. 2, the first electrode 17 is connected to the negative electrode of the voltage source 5. The voltage source 5 supplies electrons to the first electrode 17. Oxygen ($O_2$) receives the electrons at an interface between the first electrode 17 and the solid electrolyte 20 and is converted into oxygen ions ($2O^{2-}$). The solid electrolyte 20 is being heated by the heater 12 at a temperature of 400° C. or higher and 750° C. or lower, for example. The solid electrolyte 20 causes the oxygen ions to be conducted from the first surface 20a of the solid electrolyte 20 to the second surface 20b of the solid electrolyte 20. Due to the conduction of the oxygen ions, the current flows between the first electrode 17 and the second electrode 27.

Since the flow rate of the measurement target gas 4 flowing into the solid electrolyte 20 is limited by the gas feed passage 16, the current flowing between the first electrode 17 and the second electrode 27 is constant even when the voltage between the first electrode 17 and the second electrode 27 is increased. This constant current is called "limiting current." A limiting current value is proportional to the concentration of the component gas (e.g., nitrogen oxide ($NO_x$)) contained in the measurement target gas 4 (e.g., exhaust gas). The limiting current value is measured by the current detector 6 illustrated in FIG. 2. From this limiting current value, the concentration of the component gas contained in the measurement target gas 4 can be obtained. The voltage source 5 may be a variable voltage source. Varying the magnitude of the voltage applied between the first electrode 17 and the second electrode 27 can obtain another limiting current value corresponding to another component gas (e.g., water vapor ($H_2O$) or oxygen ($O_2$)) contained in the measurement target gas 4. From another limiting current value, the concentration of another component gas (e.g., water vapor ($H_2O$) or oxygen ($O_2$)) can be obtained.

As illustrated in FIG. 2, the second electrode 27 is connected to the positive electrode of the voltage source 5. The voltage source 5 deprives the second electrode 27 of the electrons. The oxygen ions ($2O^{2-}$) that have reached the second electrode 27 are deprived of electrons at the interface between the second electrode 27 and the solid electrolyte 20 and converted into oxygen ($O_2$). The gas such as oxygen ($O_2$) flows through the second electrode 27, that is, the second porous metal electrode, and reaches the gas discharge passage 30. The gas discharge passage 30 can pass the gas more easily than the second electrode 27. The gas such as oxygen ($O_2$) is mainly discharged from the gas outlet 36 through the gas discharge passage 30.

With reference to FIGS. 11 to 23, the operation of the limiting-current type gas sensor 1 according to an example of the present embodiment will be described, comparing with a comparative example. A limiting-current type gas sensor according to the comparative example differs from the limiting-current type gas sensor 1 according to the example of the present embodiment in the following points. The limiting-current type gas sensor according to the comparative example does not include the gas feed passage 16, which is formed of the first porous transition metal oxide, and the gas discharge passage 30, which is formed of the second porous transition metal oxide. In the limiting-current type gas sensor according to the comparative example, the first electrode 17 is a porous platinum electrode and functions as a gas feed passage, while the second electrode 27 is a porous platinum electrode and functions as a gas discharge passage.

Figure 12:
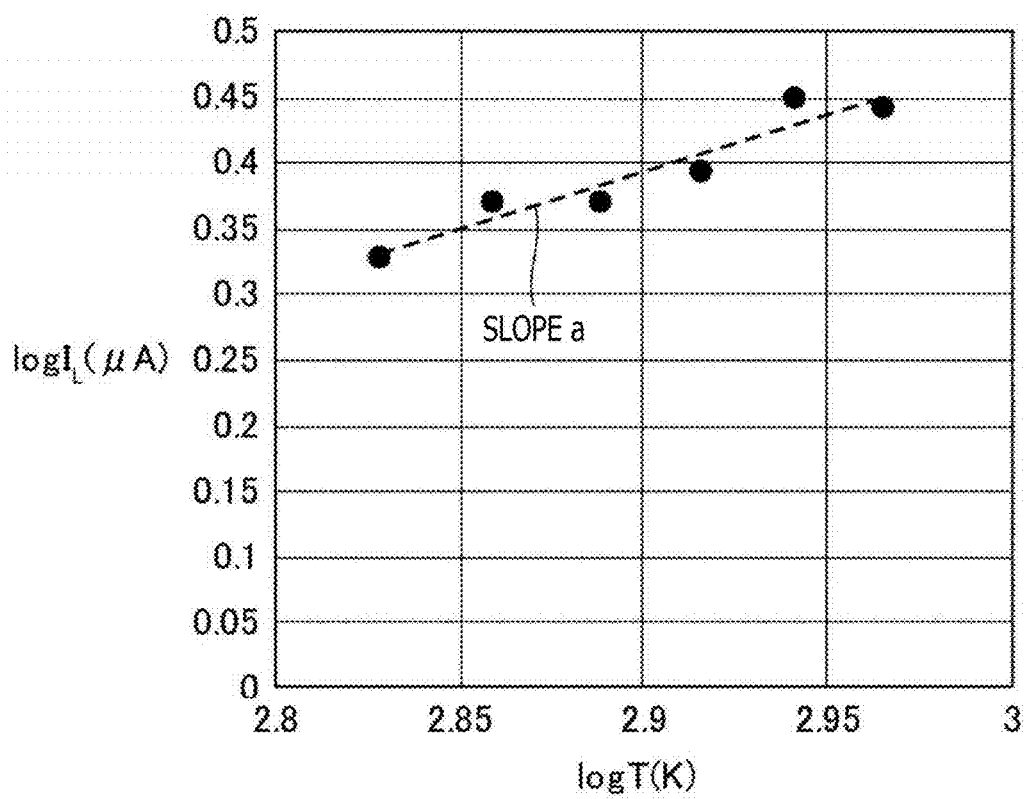
FIG. 12 illustrates a method of calculating the temperature coefficient of the limiting current value of each limiting-current type gas sensor.

The temperature coefficient of the limiting current value of each limiting-current type gas sensor was calculated using the following method as illustrated in FIG. 12. Plural samples of the limiting-current type gas sensor according to the comparative example were manufactured. Plural samples of the limiting-current type gas sensor 1 according to the example were also manufactured. The method of calculating the temperature coefficient of the limiting current value is as follows. While changing a temperature T of each sample, a limiting current value IL of each sample is measured. Then, a relation between log IL, which is a logarithm of the limiting current value IL, and log T, which is a logarithm of the temperature T, is linearly approximated using a least-squares method. A slope a of this approximation line is obtained as the temperature coefficient of the limiting current value of the corresponding limiting-current type gas sensor.

Figure 11:
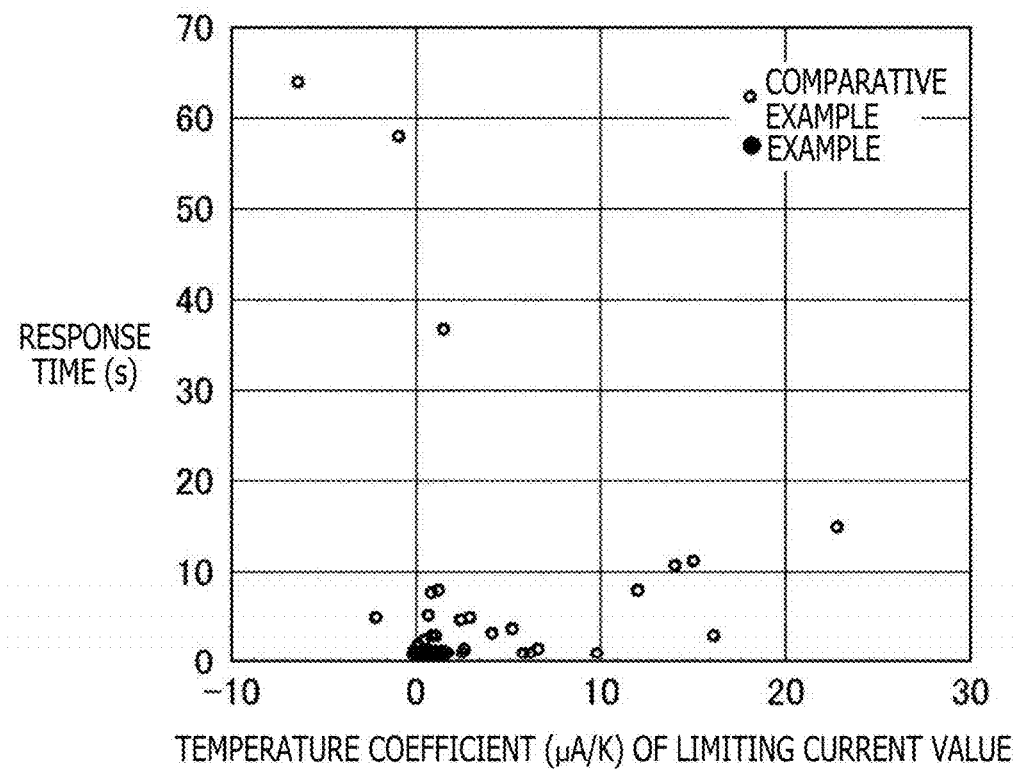
FIG. 11 illustrates variations in temperature coefficients of limiting current values among limiting-current type gas sensors according to an example of the first embodiment and limiting-current type gas sensors according to a comparative example and variations in response times among the limiting-current type gas sensors according to the example of the first embodiment and the limiting-current type gas sensors according to the comparative example.

As illustrated in FIG. 11, variations in the temperature coefficients of the limiting current values among the plural samples according to the example are smaller than variations in the temperature coefficients of the limiting current values among the plural samples according to the comparative example. The reason for this can be considered as follows. Note that, when there is no need to distinguish between the plural samples according to the comparative example, the plural samples according to the comparative example will be collectively referred to as "the sample according to the comparative example." Similarly, when there is no need to distinguish between the plural samples according to the example, the plural samples according to the example will be collectively referred to as "the sample according to the example."

Figure 13:
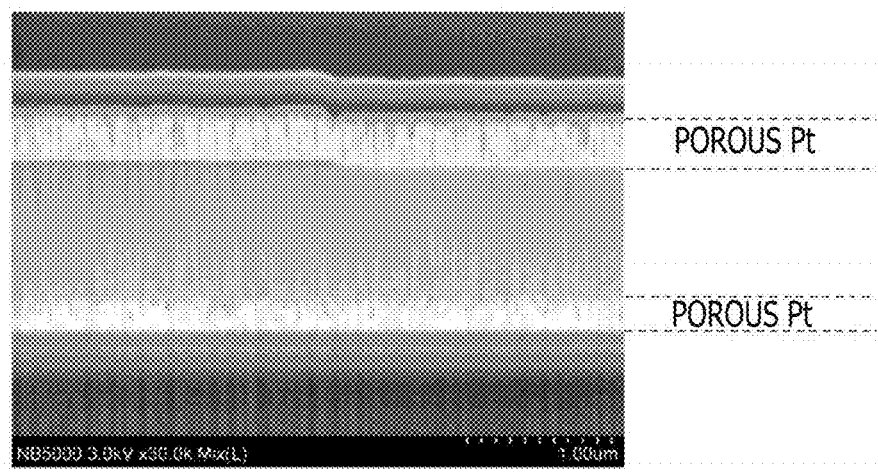
FIG. 13 is a scanning electron microscope (SEM) photograph of a cross section of a porous platinum film, which functions as a gas feed passage and a gas discharge passage, of one limiting-current type gas sensor according to the comparative example before the limiting-current type gas sensor according to the comparative example is annealed at a temperature of 700° C. for one hour.
Figure 14:
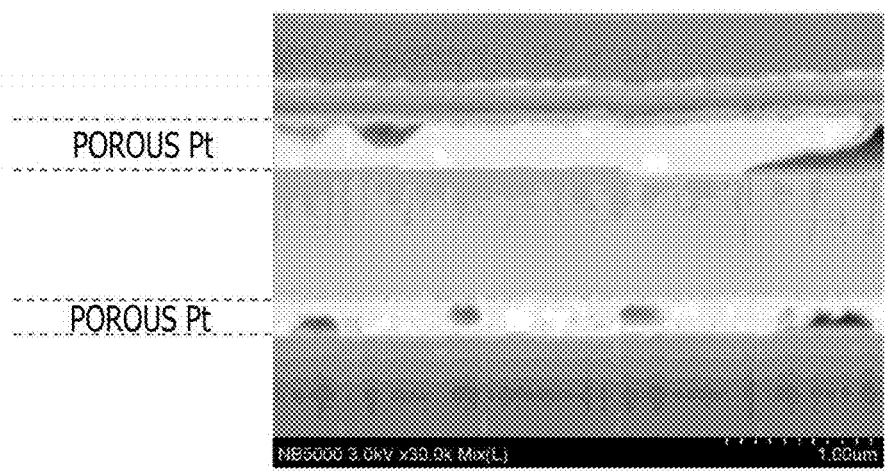
FIG. 14 is a SEM photograph of a cross section of the porous platinum film, which functions as the gas feed passage and the gas discharge passage, of the limiting-current type gas sensor according to the comparative example after the limiting-current type gas sensor according to the comparative example is annealed at a temperature of 700° C. for one hour.

When the sample according to the comparative example is operated at a high temperature to enable ion conduction in the solid electrolyte 20, the vacancies in the first electrode 17, i.e., the porous platinum electrode, agglomerate. As illustrated in FIG. 13, before the sample according to the comparative example is annealed, the vacancies are uniformly distributed in the first electrode 17 functioning as the gas feed passage 16. However, as illustrated in FIG. 14, when the sample according to the comparative example is annealed at a temperature of 700° C., the vacancies in the first electrode 17 agglomerate. In between the agglomerated large vacancies, the first electrode 17 having no vacancies extends long along the upper surface of the substrate 10. Therefore, when the sample according to the comparative example is operated at a high temperature, the flow rate of the gas flowing through the first electrode 17 functioning as the gas feed passage 16 significantly decreases. Moreover, how the vacancies agglomerate significantly varies among the plural samples according to the comparative example. For this reason, the variations in the temperature coefficients of the limiting current values among the plural samples according to the comparative example are large.

Figure 15:
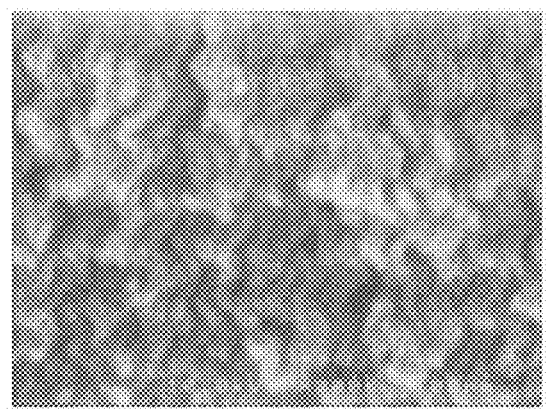
FIG. 15 is a SEM photograph of a cross section of a porous $Ta_2O_5$ film, which functions as a gas feed passage, of one limiting-current type gas sensor according to the first embodiment before the limiting-current type gas sensor according to the first embodiment is annealed at a temperature of 700° C. for one hour.
Figure 16:
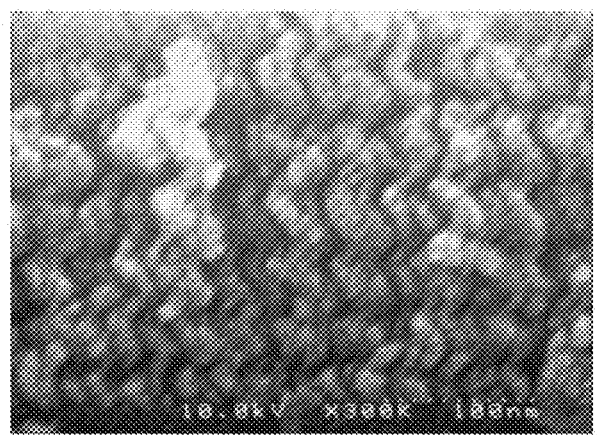
FIG. 16 is a SEM photograph of a cross section of the porous $Ta_2O_5$ film, which functions as the gas feed passage, of the limiting-current type gas sensor according to the first embodiment after the limiting-current type gas sensor according to the first embodiment is annealed at a temperature of 700° C. for one hour.

By contrast, even when the sample according to the example is operated at a high temperature to enable ion conduction in the solid electrolyte 20, the vacancies in the gas feed passage 16 formed of the first porous transition metal oxide are little agglomerated. As illustrated in FIG. 15, before the sample according to the example is annealed, the vacancies in the gas feed passage 16 are uniformly distributed. Even after the sample according to the example is annealed at a temperature of 700° C., the vacancies in the gas feed passage 16 remain uniformly distributed, as illustrated in FIG. 16. Therefore, the variations in the temperature coefficients of the limiting current values among the plurality of samples according to the example are small. Even when the sample according to the example is operated at a high temperature, there is little change in the flow rate of the gas flowing through the gas feed passage 16.

The following can be considered as the reason why the vacancies in the gas feed passage 16 formed of the first porous transition metal oxide are little agglomerated even when the sample according to the example is operated at a high temperature. Assume a case where a metal is at a temperature of less than a melting point of the metal. In this case, in general, as the temperature of the metal is getting closer to the melting point of the metal, more metal atoms in the metal move longer. Moreover, metal atoms in a metal oxide are harder to move than metal atoms in a metal. In the example, the first electrode 17 is the first porous metal electrode, while the gas feed passage 16 is formed of the first porous transition metal oxide having the second melting point higher than the first melting point of the first electrode 17. For this reason, it is considered that, in the example, the vacancies in the gas feed passage 16 are little agglomerated.

Figure 17:
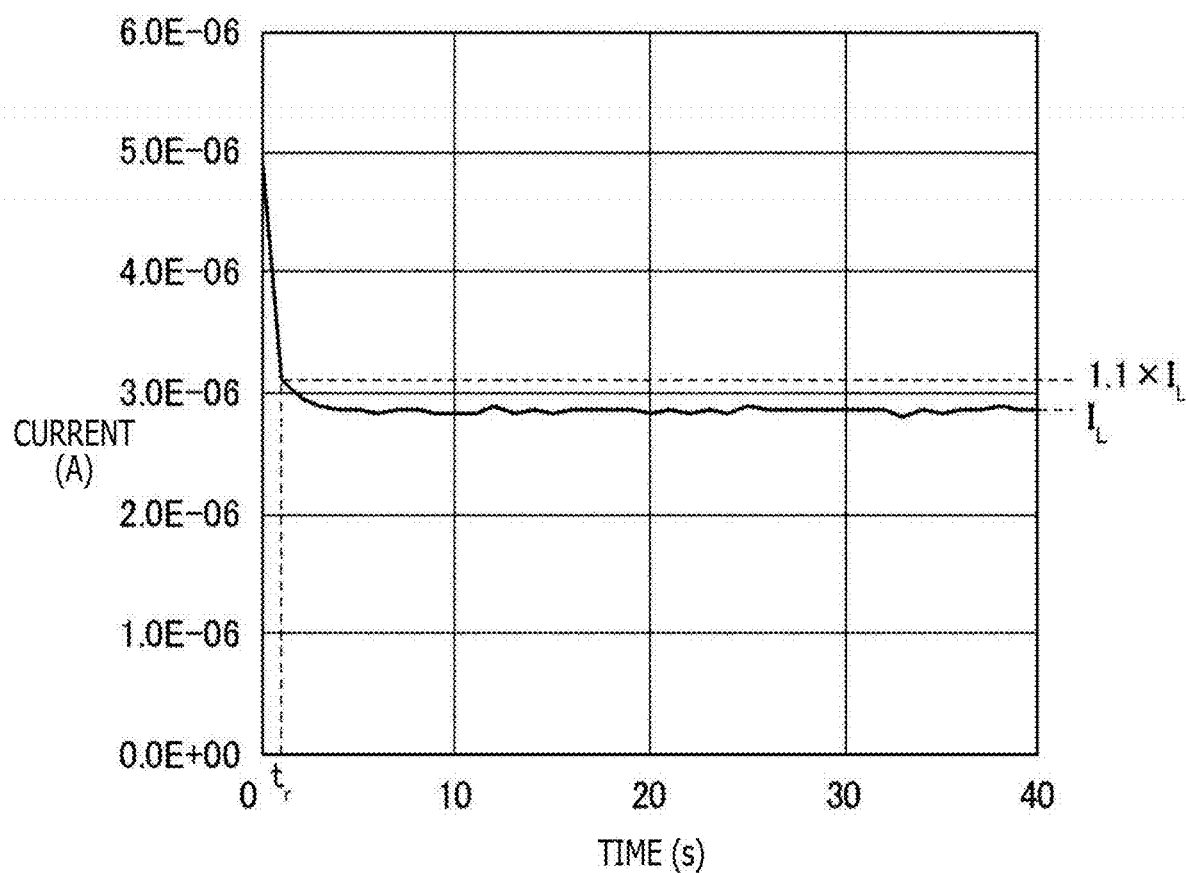
FIG. 17 illustrates a method of calculating the response time of the limiting current value of each limiting-current type gas sensor.

A response time $t_r$ of each limiting-current type gas sensor was calculated using the following method as illustrated in FIG. 17. Plural samples of the limiting-current type gas sensor according to the comparative example were manufactured. Plural samples of the limiting-current type gas sensor 1 according to the example were manufactured. The method of calculating the response time $t_r$ is as follows. Each sample is exposed to the measurement target gas 4. At time t=0, each sample is connected to the voltage source 5. Then, a change in a current value output from each sample over time (a transient response of each limiting-current type gas sensor) is measured. An average current value during a period of time in which the current value output from each sample can be regarded as constant is the limiting current value IL of each sample. The amount of time from time t=0 until the current value output from each sample becomes 1.1 times the limiting current value IL is obtained as the response time $t_r$ of each sample.

As illustrated in FIG. 11, variations in the response times among the plural samples according to the example are smaller than variations in the response times among the plural samples according to the comparative example. The reason for this is similar to the reason why the variations in the temperature coefficients of the limiting current values among the plural samples according to the example are smaller than the variations in the temperature coefficients of the limiting current values among the plural samples according to the comparative example.

Specifically, when the sample according to the comparative example is operated at a high temperature to enable ion conduction in the solid electrolyte 20, the vacancies in the first electrode 17, i.e., the porous platinum electrode, agglomerate. How the vacancies agglomerate significantly varies among the plural samples according to the comparative example. For this reason, the variations in the response times among the plural samples according to the comparative example are large. By contrast, even when the sample according to the example is operated at a high temperature to enable ion conduction in the solid electrolyte 20, the vacancies in the gas feed passage 16 formed of the first porous transition metal oxide are little agglomerated. Therefore, the variations in the response times among the plural samples according to the example are small.

Moreover, the response times of the samples according to the example tend to be shorter than the response times of the samples according to the comparative example. The reason for this is as follows. When the sample according to the comparative example is operated at a high temperature to enable ion conduction in the solid electrolyte 20, the vacancies in the first electrode 17, i.e., the porous platinum electrode, agglomerate. The flow rate of the gas flowing through the first electrode 17 functioning as the gas feed passage 16 significantly decreases. This increases the response time of the sample according to the comparative example. By contrast, even when the sample according to the example is operated at a high temperature to enable ion conduction in the solid electrolyte 20, the vacancies in the gas feed passage 16 formed of the first porous transition metal oxide are little agglomerated. Moreover, there is little change in the flow rate of the gas flowing through the gas feed passage 16. For this reason, the response time of the sample according to the example is short.

An operation of the gas discharge passage 30 formed of the second porous transition metal oxide is similar to the operation of the gas feed passage 16 formed of the first porous transition metal oxide described above. Even when only one of the gas feed passage 16 and the gas discharge passage 30 is formed of a porous transition metal oxide, the operation of the limiting-current type gas sensor 1 becomes similar.

Figure 18:
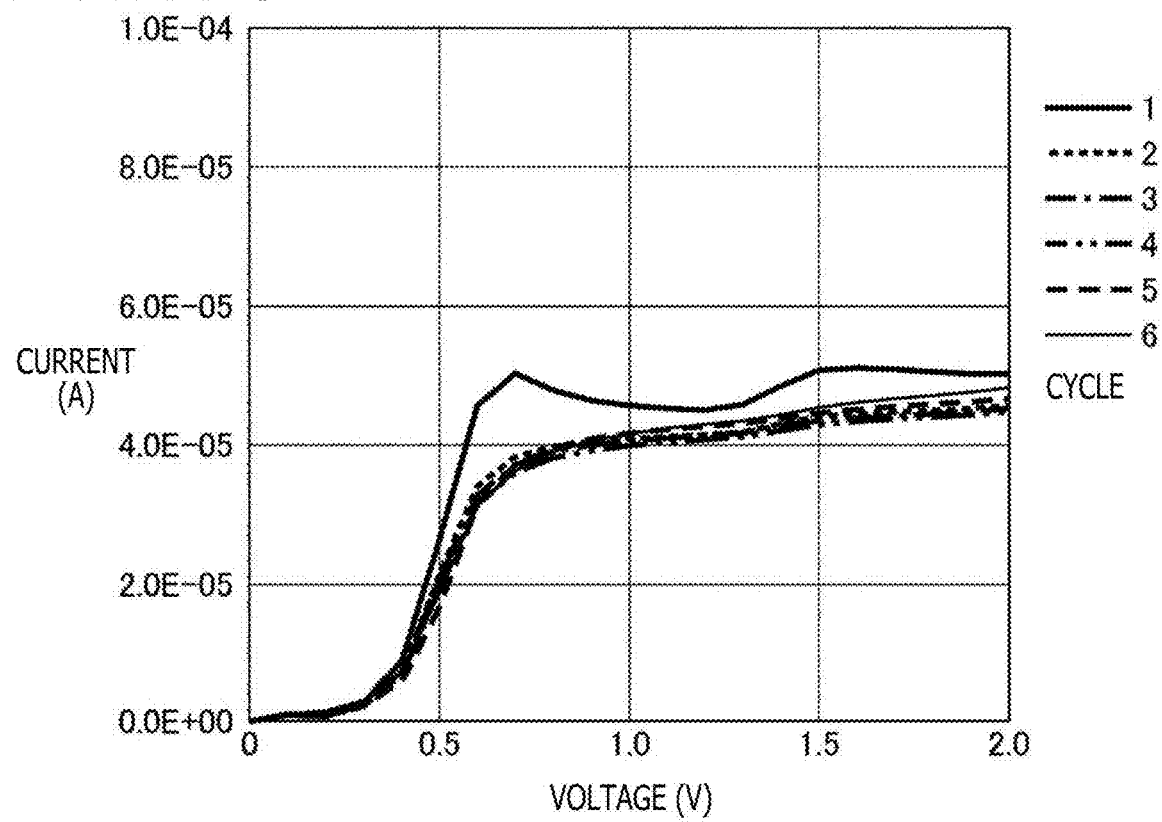
FIG. 18 illustrates a temperature cycle dependency of a voltage-current characteristic of the limiting-current type gas sensor according to Example 1.
Figure 19:
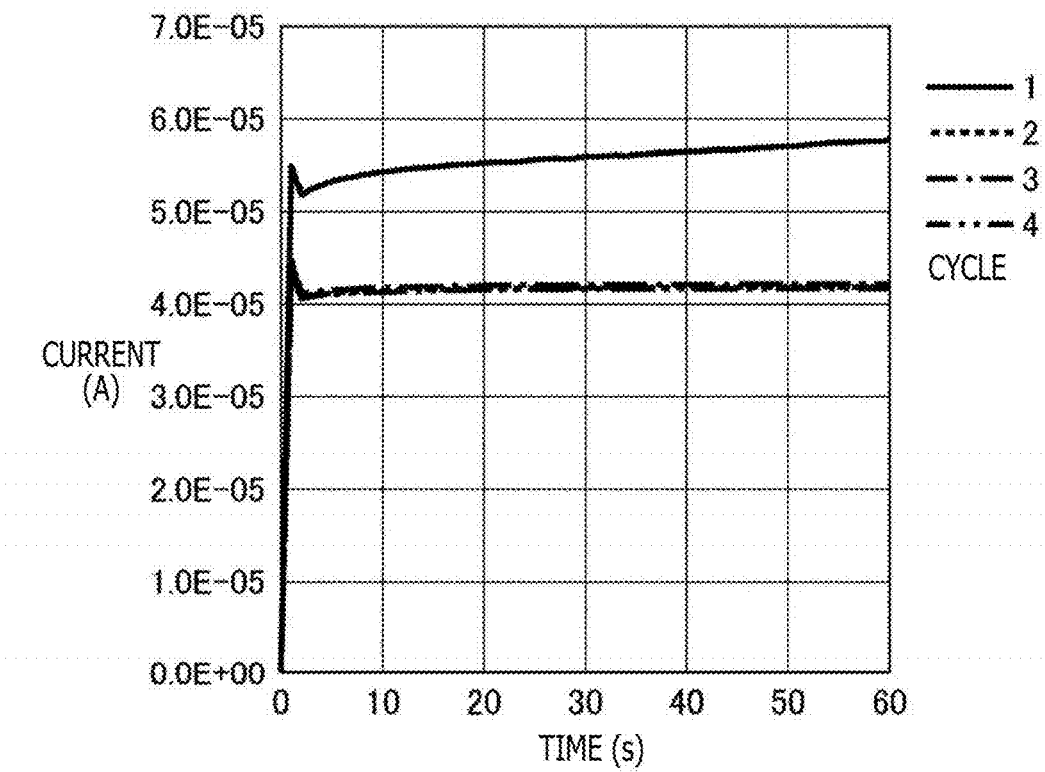
FIG. 19 illustrates a temperature cycle dependency of a transient response of the limiting-current type gas sensor according to Example 1 to which a voltage of 1.0 V is applied.
Figure 20:
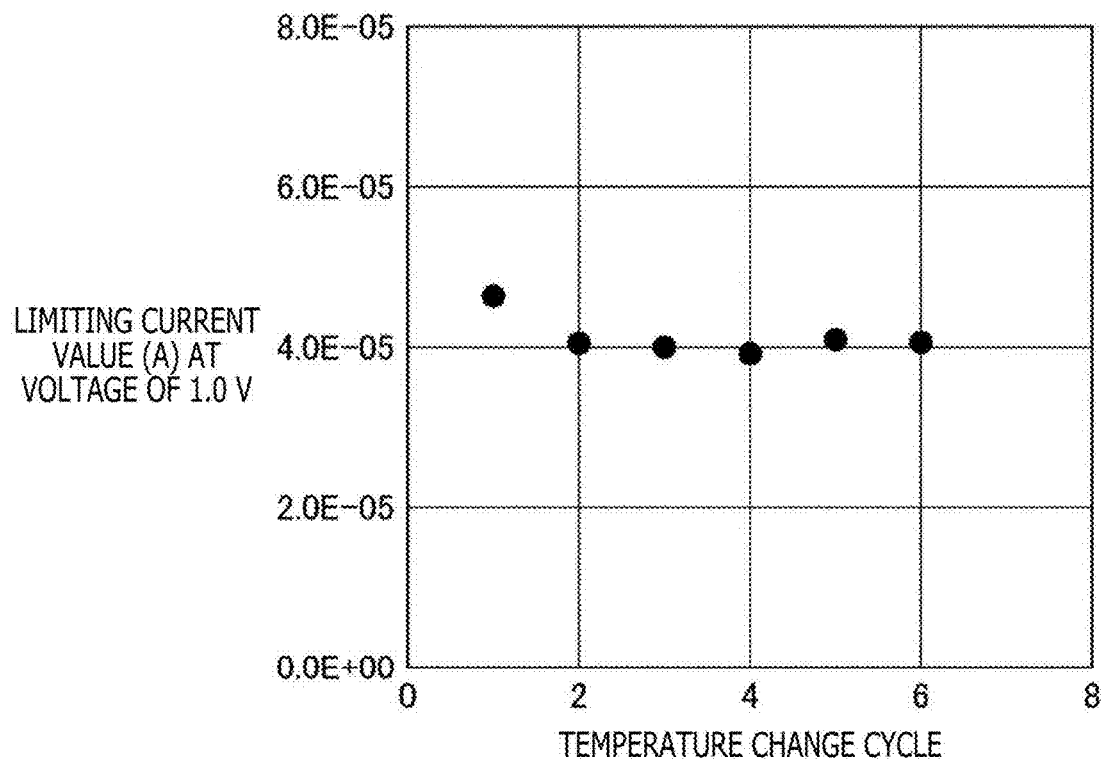
FIG. 20 illustrates a temperature cycle dependency of the limiting current value of the limiting-current type gas sensor according to Example 1 to which a voltage of 1.0 V is applied.
Figure 21:
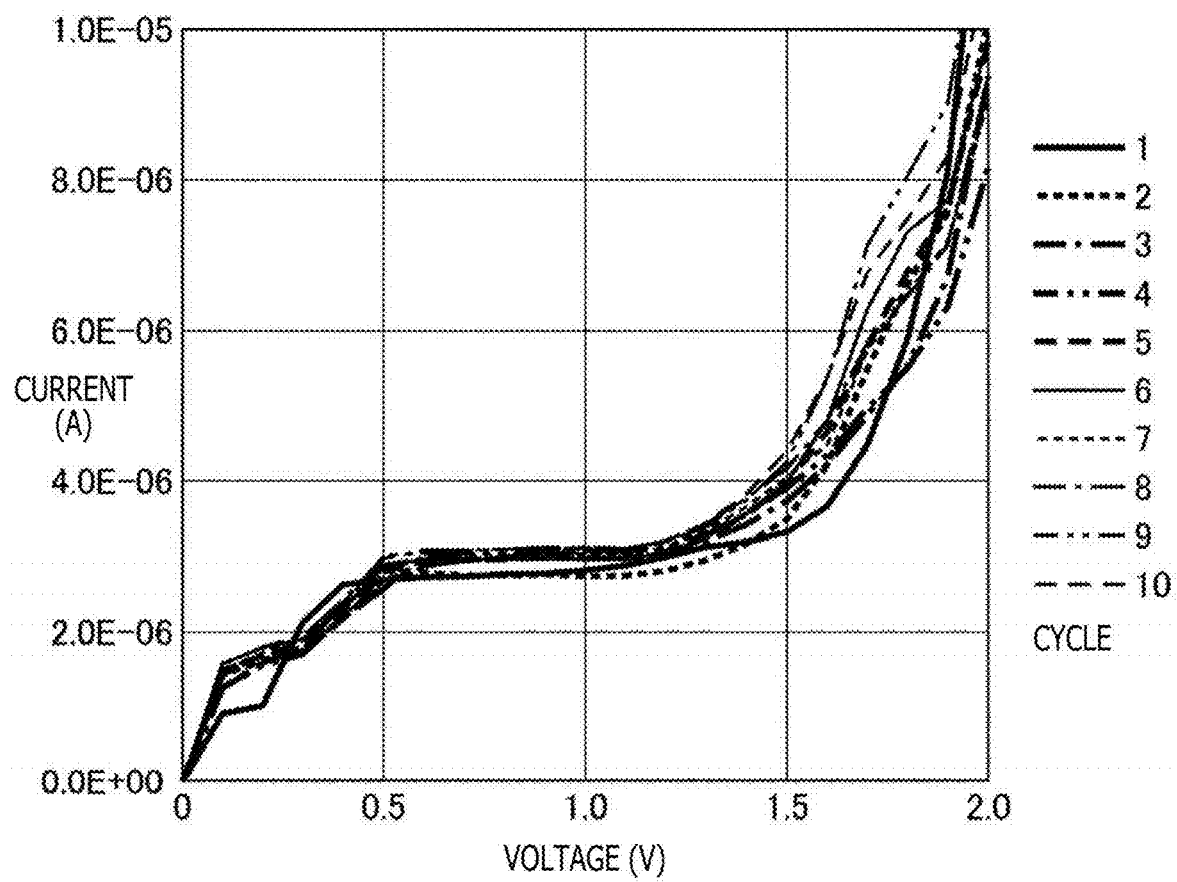
FIG. 21 illustrates a temperature cycle dependency of a voltage-current characteristic of the limiting-current type gas sensor according to Example 2.
Figure 22:
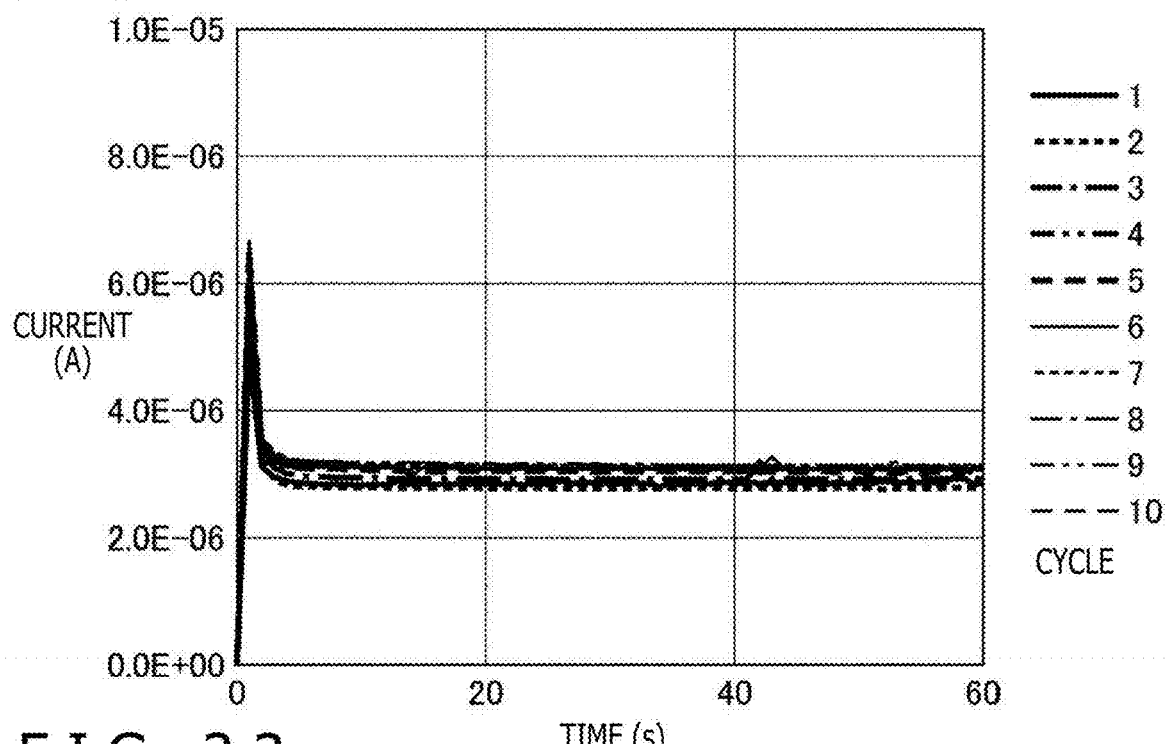
FIG. 22 illustrates a temperature cycle dependency of a transient response of the limiting-current type gas sensor according to Example 2 to which a voltage of 1.0 V is applied.
Figure 23:
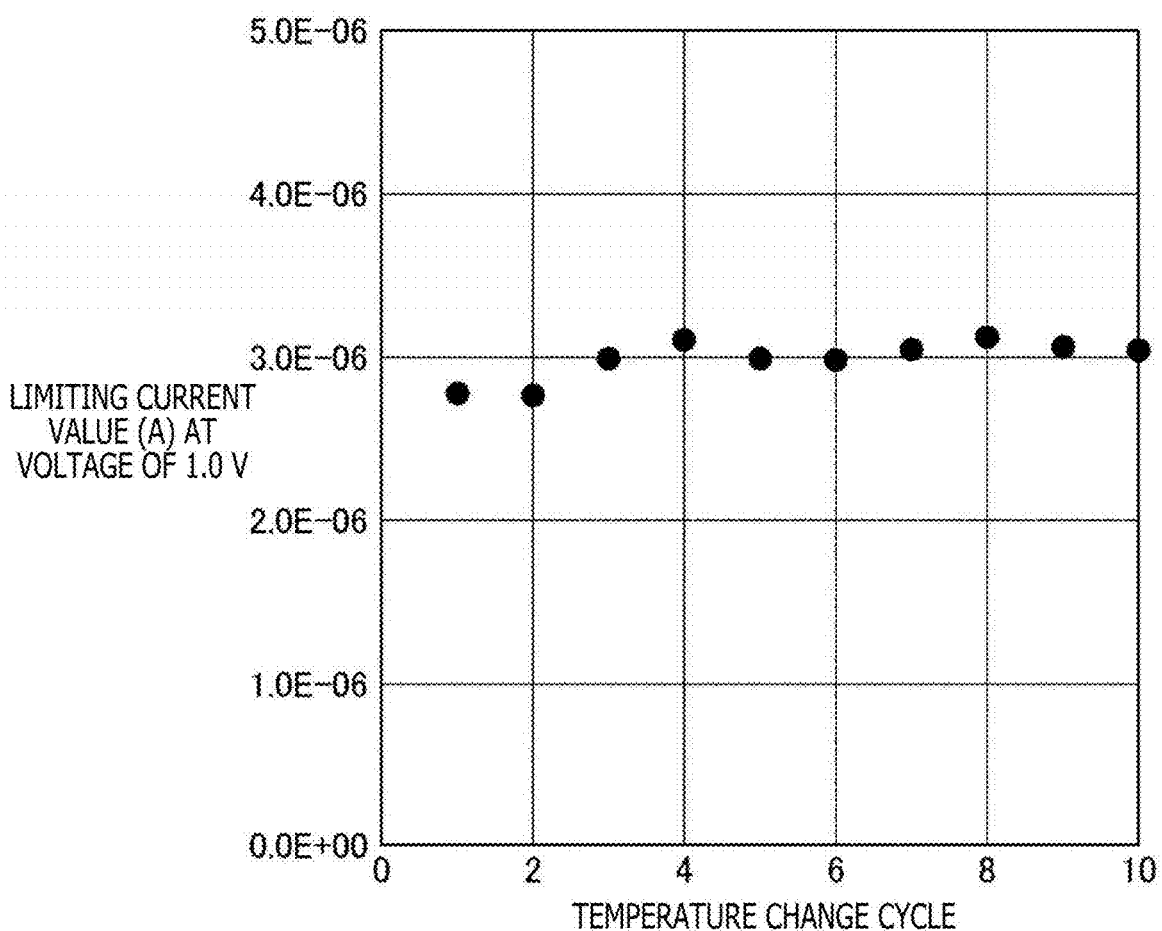
FIG. 23 illustrates a temperature cycle dependency of the limiting current value of the limiting-current type gas sensor according to Example 2 to which a voltage of 1.0 V is applied.

FIGS. 18 to 20 illustrate a temperature cycle characteristic of the limiting-current type gas sensor 1 according to Example 1. FIGS. 21 to 23 illustrate a temperature cycle characteristic of the limiting-current type gas sensor 1 according to Example 2. Each voltage in FIGS. 18 and 21 and a voltage of 1.0 V in FIGS. 20 and 23 are applied between the first electrode 17 and the second electrode 27 from the voltage source 5 (FIG. 2). A current in FIGS. 18, 19, 21, and 22 and a limiting current in FIGS. 20 and 23 are measured using the current detector 6 (FIG. 2). One temperature cycle applied to the limiting-current type gas sensor 1 includes first to fourth steps. In the first step, the limiting-current type gas sensor 1 is kept at a first temperature of 400° C. In the second step, the temperature of the limiting-current type gas sensor 1 is increased from the first temperature of 400° C. to a second temperature of 600° C. In the third step, the limiting-current type gas sensor 1 is kept at the second temperature of 600° C. In the fourth step, the temperature of the limiting-current type gas sensor 1 is decreased from the second temperature of 600° C. to the first temperature of 400° C.

In Example 1, the gas feed passage 16 and the gas discharge passage 30 are each formed by obliquely vapor-depositing a tantalum pentoxide ($Ta_2O_5$) at a vapor-deposition angle of 80°. In Example 2, the gas feed passage 16 and the gas discharge passage 30 are each formed by obliquely vapor-depositing a tantalum pentoxide ($Ta_2O_5$) at a vapor-deposition angle of 84°. As illustrated in FIGS. 18 to 23, the current output from the limiting-current type gas sensor 1 according to each of Examples 1 and 2 is stable in the second and subsequent temperature cycles. As illustrated in FIGS. 20 to 23, moreover, the current output from the limiting-current type gas sensor 1 according to Example 2 is stable in all the temperature cycles.

Performing oblique vapor-deposition at a larger vapor-deposition angle forms a film with a larger porosity (a smaller packing factor). As can be seen from the temperature cycle characteristic of the limiting-current type gas sensor 1 according to each of Examples 1 and 2 illustrated in FIGS. 18 to 23, the temperature cycle characteristic of the current of the limiting-current type gas sensor 1 is improved more when the gas feed passage 16 or the gas discharge passage 30 has a larger porosity (a smaller packing factor).

In the case of the limiting-current type gas sensor 1 according to Example 1 illustrated in FIGS. 18 to 20, one temperature cycle is preliminarily applied to the limiting-current type gas sensor 1 according to Example 1 before the limiting-current type gas sensor 1 according to Example 1 is used. Accordingly, the temperature cycle characteristic of the current of the limiting-current type gas sensor 1 according to Example 1 can be stabilized during the use of the limiting-current type gas sensor 1 according to Example 1.

Figure 24:
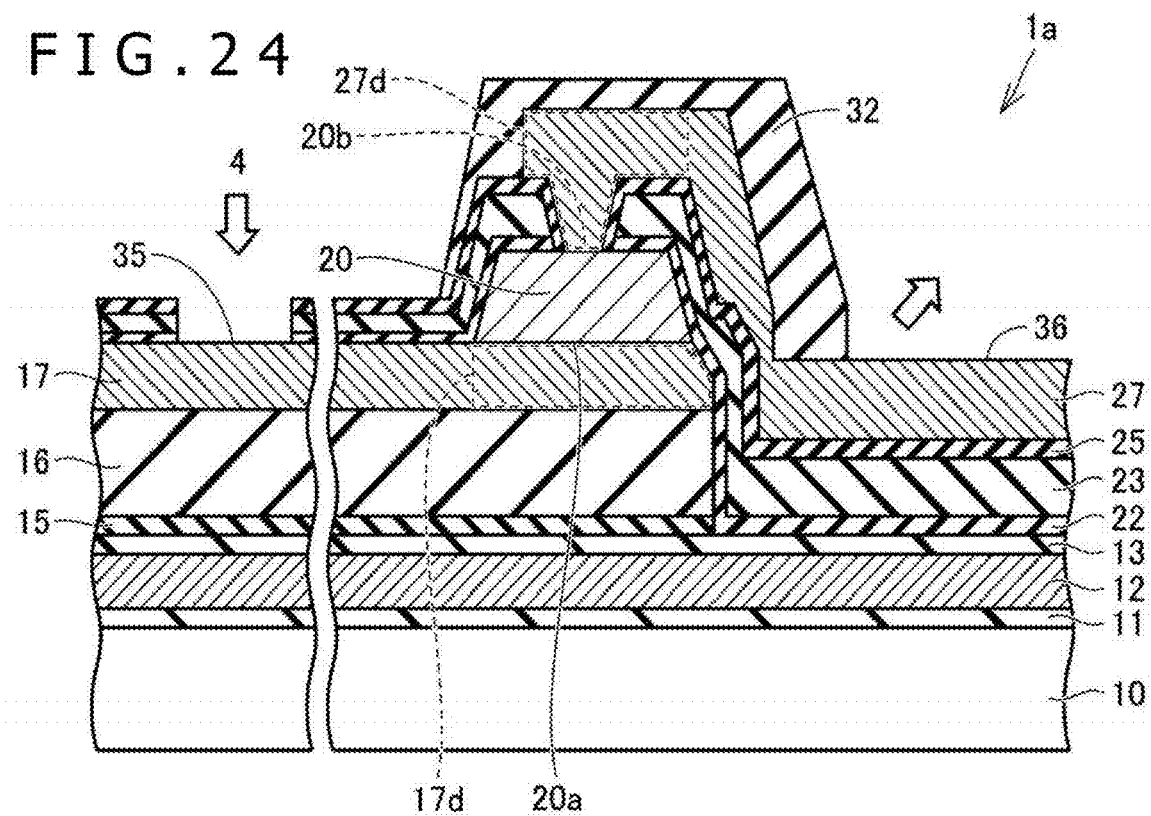
FIG. 24 is a schematic partial cross-sectional view of a limiting-current type gas sensor according to a modification of the first embodiment.

With reference to FIG. 24, the insulating layer 28 and the gas discharge passage 30 are omitted in a limiting-current type gas sensor 1a according to a modification of the present embodiment. The insulating film 32 is in contact with an upper surface of the second portion 27d of the second electrode 27. A gas is discharged from the second electrode 27, which is the second porous metal electrode. Since the insulating layer 28 and the gas discharge passage 30 are not formed in the limiting-current type gas sensor 1a according to the modification of the present embodiment, the cost of the limiting-current type gas sensor 1a can be saved.

Effects of the limiting-current type gas sensor 1(1a) according to the present embodiment will be described below. The limiting-current type gas sensor 1(1a) according to the present embodiment includes the solid electrolyte 20, the first electrode 17, the second electrode 27, and the gas feed passage 16. The first electrode 17 is disposed on the solid electrolyte 20. The second electrode 27 is disposed on the solid electrolyte 20. The gas feed passage 16 extends between the gas inlet 35 and the first portion 17d of the first electrode 17. The first portion 17d faces the solid electrolyte 20. The first electrode 17 is the first porous metal electrode. The gas feed passage 16 is formed of the first porous transition metal oxide having the second melting point higher than the first melting point of the first electrode 17. The first porous transition metal oxide is $Ta_2O_5$, $TiO_2$, or $Cr_2O_3$.

Therefore, even when the limiting-current type gas sensor 1(1a) is operated at a high temperature, the vacancies in the gas feed passage 16 formed of the first porous transition metal oxide are little agglomerated. With the limiting-current type gas sensor 1(1a) according to the present embodiment, the variation in the temperature coefficient of the limiting current value of the limiting-current type gas sensor 1(1a) can be reduced. Moreover, the variation in the response time of the limiting-current type gas sensor 1(1a) can be reduced.

Even when the limiting-current type gas sensor 1(1a) is operated at a high temperature, the vacancies in the gas feed passage 16 formed of the first porous transition metal oxide are little agglomerated, and there is little change in the flow rate of the measurement target gas 4 flowing through the gas feed passage 16. Therefore, the response time of the limiting-current type gas sensor 1(1a) can be shortened.

Moreover, the first porous transition metal oxide is $Ta_2O_5$, $TiO_2$ or $Cr_2O_3$ and contains only one type of transition metal. With this configuration, the variation in the chemical composition of the gas feed passage 16 formed of the first porous transition metal oxide can be reduced. The variation in the limiting current value of the limiting-current type gas sensor 1(1a), the variation in the temperature coefficient of the limiting-current type gas sensor 1(1a), and the variation in the response time of the limiting-current type gas sensor 1(1a) can also be reduced.

In the limiting-current type gas sensor 1(1a) according to the present embodiment, the first packing factor of the gas feed passage 16 is 60% or less. Therefore, the measurement target gas 4 can easily pass through the gas feed passage 16. Thus, the response time of the limiting-current type gas sensor 1(1a) can be shortened. Moreover, thermal strain that occurs in the solid electrolyte 20 during operation of the limiting-current type gas sensor 1(1a) can be alleviated in the gas feed passage 16. Thus, the variation in the temperature coefficient of the limiting current value of the limiting-current type gas sensor 1(1a) can be reduced.

In the limiting-current type gas sensor 1(1a) according to the present embodiment, the first porous metal electrode is formed of platinum or palladium. Therefore, ions to be conducted through the solid electrolyte 20 can be generated from the measurement target gas 4 with a high efficiency at the interface between the first electrode 17, which is the first porous metal electrode, and the solid electrolyte 20. In a case where nitrogen oxide ($NO_x$) is contained in the measurement target gas 4, the first porous metal electrode acts as a catalyst that decomposes the nitrogen oxides ($NO_x$) contained in the measurement target gas 4 into nitrogen and oxygen. The limiting-current type gas sensor 1(1a) has an improved gas detection sensitivity. Moreover, a reduced interface resistance between the first electrode 17 and the solid electrolyte 20 can expand a voltage range (overvoltage-dominant region) where the current flowing through the limiting-current type gas sensor 1(1a) becomes constant.

In the limiting-current type gas sensor 1(1a) according to the present embodiment, the second electrode 27 is the second porous metal electrode. The second melting point of the first porous transition metal oxide is higher than the third melting point of the second electrode 27.

Therefore, even when the limiting-current type gas sensor 1(1a) is operated at a high temperature, the vacancies in the gas feed passage 16 formed by the first porous transition metal oxide are little agglomerated. With the limiting-current type gas sensor 1(1a) according to the present embodiment, the variation in the temperature coefficient of the limiting current value of the limiting-current type gas sensor 1(1a) can be reduced. Moreover, the variation in the response time of the limiting-current type gas sensor 1(1a) can be reduced. The response time of the limiting-current type gas sensor 1(1a) can also be shortened.

In the limiting-current type gas sensor 1(1a) according to the present embodiment, the second porous metal electrode is formed of platinum or palladium. Therefore, ions to be conducted through the solid electrolyte 20 can be converted into gas with a high efficiency at the interface between the second electrode 27, which is the second porous metal electrode, and the solid electrolyte 20. Moreover, a reduced interface resistance between the second electrode 27 and the solid electrolyte 20 can expand a voltage range (overvoltage-dominant region) where the current flowing through the limiting-current type gas sensor 1(1a) becomes constant.

The limiting-current type gas sensor 1 according to the present embodiment further includes the gas discharge passage 30. The gas discharge passage 30 extends between the gas outlet 36 and the second portion 27d of the second electrode 27. The second portion 27d faces the solid electrolyte 20. The gas discharge passage 30 is formed of the second porous transition metal oxide having the fourth melting point higher than the third melting point of the second electrode 27. The second porous transition metal oxide is $Ta_2O_5$, $TiO_2$, or $Cr_2O_3$.

Therefore, even when the limiting-current type gas sensor 1 is operated at a high temperature, the vacancies in the gas discharge passage 30 formed of the second porous transition metal oxide are little agglomerated. With the limiting-current type gas sensor 1 according to the present embodiment, the variation in the temperature coefficient of the limiting current value of the limiting-current type gas sensor 1 can be reduced. Moreover, the variation in the response time of the limiting-current type gas sensor 1 can be reduced.

Even when the limiting-current type gas sensor 1 is operated at a high temperature, the vacancies in the gas discharge passage 30 formed of the second porous transition metal oxide are little agglomerated, and there is little change in the flow rate of the gas flowing through the gas discharge passage 30. Therefore, the response time of the limiting-current type gas sensor 1 can be shortened.

Moreover, the second porous transition metal oxide is $Ta_2O_5$, $TiO_2$, or $Cr_2O_3$ and contains only one type of transition metal. Therefore, the variation in the chemical composition of the gas discharge passage 30 formed of the second porous transition metal oxide can be reduced. The variation in the limiting current value of the limiting-current type gas sensor 1, the variation in the temperature coefficient of the limiting-current type gas sensor 1, and the variation in the response time of the limiting-current type gas sensor 1 can also be reduced.

In the limiting-current type gas sensor 1 according to the present embodiment, the second packing factor of the gas discharge passage 30 is 60% or less. Therefore, the gas can easily pass through the gas discharge passage 30. Thus, the response time of the limiting-current type gas sensor 1 can be shortened. Moreover, with the porosity of the gas discharge passage 30 increased, thermal strain that occurs in the solid electrolyte 20 during operation of the limiting-current type gas sensor 1 can be alleviated in the gas discharge passage 30. Thus, the variation in the temperature coefficient of the limiting current value of the limiting-current type gas sensor 1 can be reduced.

The limiting-current type gas sensor 1(1a) according to the present embodiment further includes the insulating film 32. The insulating film 32 covers the laminate including the first portion 17d of the first electrode 17, the solid electrolyte 20, and the second portion 27d of the second electrode 27. The second portion 27d faces the solid electrolyte 20.

Since the insulating film 32 covers the laminate, the insulating film 32 can fix the porous films such as the gas feed passage 16 and the gas discharge passage 30 in the direction along the upper surface of the substrate 10. This configuration, moreover, suppresses the agglomeration of the vacancies in the gas feed passage 16 and the gas discharge passage 30. With the limiting-current type gas sensor 1(1a) according to the present embodiment, the variation in the temperature coefficient of the limiting current value of the limiting-current type gas sensor 1(1a) can be reduced. Moreover, the variation in the response time of the limiting-current type gas sensor 1(1a) can be reduced. The response time of the limiting-current type gas sensor 1(1a) can also be shortened.

The limiting-current type gas sensor 1(1a) according to the present embodiment further includes the heater 12, which heats the solid electrolyte 20, and the substrate 10 on which the heater 12 is disposed. The first electrode 17 is disposed on the first surface 20a of the solid electrolyte 20. The first surface 20a faces the substrate 10. The second electrode 27 is disposed on the second surface 20b of the solid electrolyte 20. The second surface 20b is on the opposite side of the first surface 20a. This configuration can shorten the time taken from the start of heating the heater 12 to the start of operating the limiting-current type gas sensor 1(1a). Moreover, this configuration can make the limiting-current type gas sensor 1(1a) compact in size.

Second Embodiment

Figure 25:
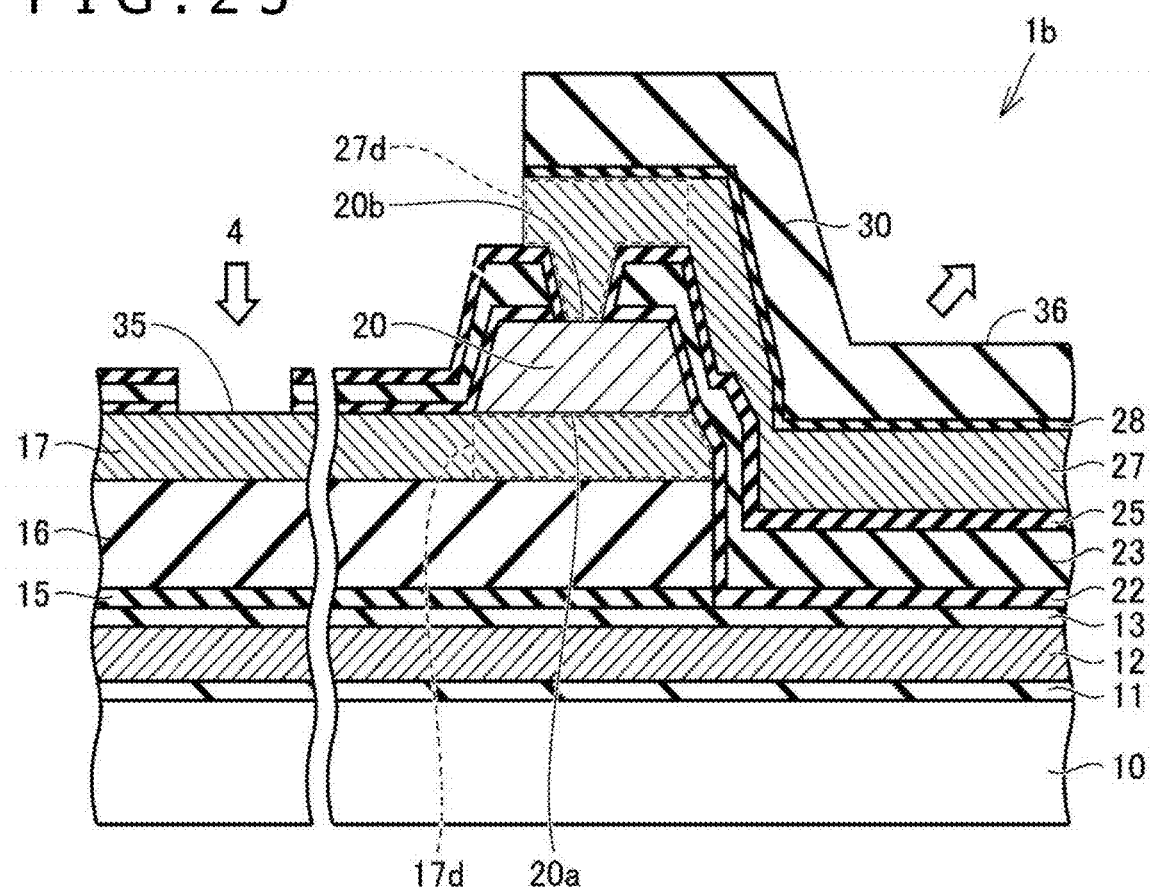
FIG. 25 is a schematic partial cross-sectional view of a limiting-current type gas sensor according to a second embodiment.

With reference to FIG. 25, a limiting-current type gas sensor 1b according to a second embodiment will be described. Although the limiting-current type gas sensor 1b according to the present embodiment has a similar configuration and effect to those of the limiting-current type gas sensor 1 according to the first embodiment, they differ from each other mainly in the following points.

In the limiting-current type gas sensor 1b according to the present embodiment, the insulating film 32 is omitted. An upper surface of the gas discharge passage 30 is exposed to the surrounding environment of the limiting-current type gas sensor 1b. The surrounding environment includes, for example, the measurement target gas 4. The gas discharge passage 30 is exposed to the measurement target gas 4. Since the insulating film 32 is not formed in the limiting-current type gas sensor 1b, the cost of the limiting-current type gas sensor 1b can be saved.

Figure 26:
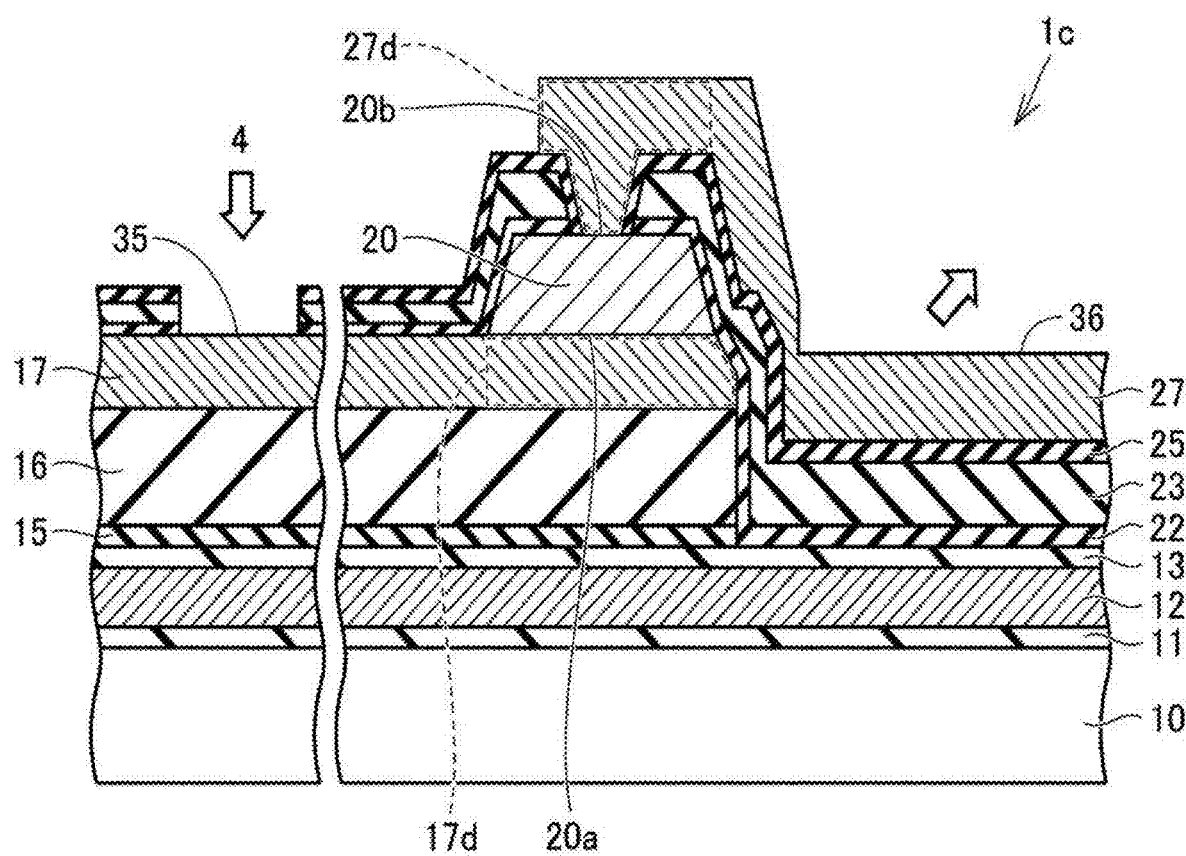
FIG. 26 is a schematic partial cross-sectional view of a limiting-current type gas sensor according to a modification of the second embodiment.

With reference to FIG. 26, a limiting-current type gas sensor 1c according to a modification of the present embodiment will be described. In the limiting-current type gas sensor 1c, the insulating layer 28 and the gas discharge passage 30 are further omitted. The upper surface of the second portion 27d of the second electrode 27 is exposed to the surrounding environment of the limiting-current type gas sensor 1c. The surrounding environment includes, for example, the measurement target gas 4. The second electrode 27 is exposed to the measurement target gas 4. The gas is discharged from the second electrode 27, which is the second porous metal electrode. Since the insulating layer 28 and the gas discharge passage 30 are not formed in the limiting-current type gas sensor 1c, the cost of the limiting-current type gas sensor 1c can be saved.

The first and second embodiments and their modifications disclosed herein should be understood to be in every respect illustrative and not restrictive. The scope of the present disclosure is defined not by the description above but by the terms of the claims, and is intended to include any changes made within the meaning and scope equivalent to the terms of the claims.

What is claimed is:

1. A limiting-current type gas sensor, comprising:
    a solid electrolyte;
    a first electrode disposed on the solid electrolyte;
    a second electrode disposed on the solid electrolyte;
    a gas feed passage extending between a gas inlet and a first portion of the first electrode, the first portion facing the solid electrolyte;
    a first insulating layer disposed on each of the first electrode, a side surface of the gas feed passage, an upper surface of the solid electrolyte, and a side surface of the solid electrolyte; and
    a second insulating layer disposed on the first insulating layer, wherein
        the first insulating layer and the second insulating layer include an opening,
        the opening corresponds to the gas inlet,
        the first electrode is a first porous metal electrode,
        the gas feed passage is a layer formed of a first porous transition metal oxide having a second melting point higher than a first melting point of the first electrode, and
        the first porous transition metal oxide is $Ta_2O_5$, $TiO_2$, or $Cr_2O_3$.

2. The limiting-current type gas sensor according to claim 1, wherein a first packing factor of the gas feed passage is 60% or less.

3. The limiting-current type gas sensor according to claim 1, wherein the first porous metal electrode is formed of platinum or palladium.

4. The limiting-current type gas sensor according to claim 1, wherein
    the second electrode is a second porous metal electrode, and
    the second melting point of the first porous transition metal oxide is higher than a third melting point of the second electrode.

5. The limiting-current type gas sensor according to claim 4, wherein the second porous metal electrode is formed of platinum or palladium.

6. The limiting-current type gas sensor according to claim 4, further comprising:
    a gas discharge passage extending between a gas outlet and a second portion of the second electrode, the second portion facing the solid electrolyte, wherein
        the gas discharge passage is a layer formed of a second porous transition metal oxide having a fourth melting point higher than the third melting point of the second electrode, and
        the second porous transition metal oxide is $Ta_2O_5$, $TiO_2$, or $Cr_2O_3$.

7. The limiting-current type gas sensor according to claim 6, wherein a second packing factor of the gas discharge passage is 60% or less.

8. The limiting-current type gas sensor according to claim 1, further comprising:
    an insulating film,
        wherein the insulating film covers a laminate including the first portion of the first electrode, the solid electrolyte, and a second portion of the second electrode, the second portion facing the solid electrolyte.

9. The limiting-current type gas sensor according to claim 1, further comprising:
    a heater that heats the solid electrolyte; and
    a substrate on which the heater is disposed, wherein
        the first electrode is disposed on a first surface of the solid electrolyte, the first surface facing the substrate, and
        the second electrode is disposed on a second surface of the solid electrolyte, the second surface being on an opposite side of the first surface.

10. The limiting-current type gas sensor according to claim 1, further comprising a third insulating layer disposed on the second insulating layer,
    wherein the first insulating layer, the second insulating layer, and the third insulating layer include the opening.

* * * * *